(12) United States Patent
Yoshida et al.

(10) Patent No.: US 8,345,820 B2
(45) Date of Patent: Jan. 1, 2013

(54) RADIOGRAPHIC IMAGE CAPTURING APPARATUS AND RADIOGRAPHIC IMAGE CAPTURING METHOD

(75) Inventors: Yutaka Yoshida, Kanagawa-ken (JP); Yasunori Ohta, Kanagawa-ken (JP); Naoyuki Nishino, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 259 days.

(21) Appl. No.: 12/805,255

(22) Filed: Jul. 21, 2010

(65) Prior Publication Data

US 2011/0024644 A1    Feb. 3, 2011

(30) Foreign Application Priority Data

Jul. 30, 2009    (JP) ................... 2009-178205

(51) Int. Cl.
*G01N 23/04*    (2006.01)
(52) U.S. Cl. ............... 378/62; 378/193; 250/370.09
(58) Field of Classification Search ............. 378/62, 378/167, 189, 193; 250/370.08, 370.09
See application file for complete search history.

(56) References Cited

U.S. PATENT DOCUMENTS 7,016,467 B2 *   3/2006   Brooks .................. 378/102
7,629,587 B2    12/2009   Yagi et al. ............ 250/370.15

FOREIGN PATENT DOCUMENTS

| JP | 10-225450 | 8/1998 |
|---|---|---|
| JP | 11-104117 | 4/1999 |
| JP | 2000-105297 | 4/2000 |
| JP | 2007-103016 | 4/2007 |
| JP | 2007-222604 | 9/2007 |

OTHER PUBLICATIONS

Development of Portable X-ray Sources Using Carbon Nanostructures, AIST Press Release, Mar. 19, 2009, http://www.aist.go.jp/aist_e/latest_research/2009/20090424/20090424.html.

* cited by examiner

*Primary Examiner* — Courtney Thomas
(74) *Attorney, Agent, or Firm* — Jean C. Edwards, Esq.; Edwards Neils PLLC

(57) ABSTRACT

A radiographic image capturing apparatus includes a radiation source device housing therein a radiation source for outputting a radiation, a cassette housing therein a radiation detector for detecting the radiation which is transmitted through a subject when the subject is irradiated with the radiation by the radiation source, and converting the detected radiation into a radiographic image, and a joining mechanism for selectively integrally joining the radiation source device and the cassette to each other and separating the radiation source device and the cassette from each other when the radiation source outputs the radiation.

27 Claims, 33 Drawing Sheets

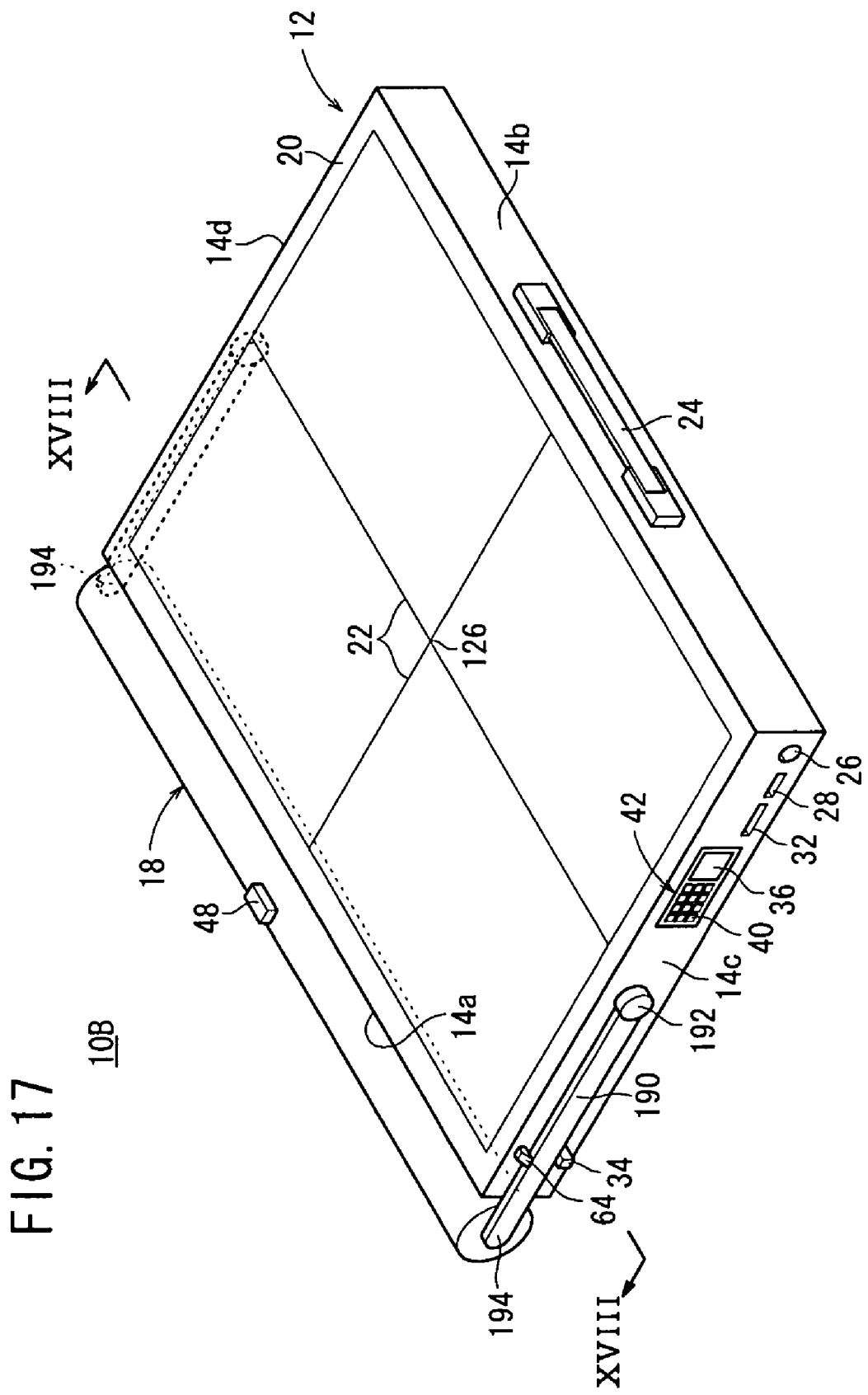

RADIOGRAPHIC IMAGE CAPTURING APPARATUS AND RADIOGRAPHIC IMAGE CAPTURING METHOD

CROSS-REFERENCE TO RELATED APPLICATION

This application is based upon and claims the benefit of priority from Japanese Patent Application No. 2009-178205 filed on Jul. 30, 2009, of which the contents are incorporated herein by reference.

BACKGROUND OF THE INVENTION

1. Field of the Invention

The present invention relates to a radiographic image capturing apparatus including a radiation source device which houses a radiation source therein and a cassette which houses a radiation detector therein, and a radiographic image capturing method for detecting a radiation output from the radiation source with the radiation detector and converting the detected radiation into a radiographic image.

2. Description of the Related Art

In the medical field, there have widely been used radiographic image capturing apparatus which apply a radiation to a subject and guide the radiation that has passed through the subject to a radiation conversion panel (radiation detector), which captures a radiographic image from the radiation. Known forms of the radiation conversion panel include a conventional radiation film for recording a radiographic image by way of exposure, and a stimulable phosphor panel for storing a radiation energy representing a radiographic image in a phosphor and reproducing the radiographic image as stimulated light by applying stimulating light to the phosphor. The radiation film with the recorded radiographic image is supplied to a developing device to develop the radiographic image, or the stimulable phosphor panel is supplied to a reading device to read the radiographic image as a visible image.

In the operating room or the like, it is necessary to read a recorded radiographic image immediately from a radiation conversion panel after the radiographic image is captured for the purpose of quickly and appropriately treating the patient. As a radiation detector which meets such a requirement, there have been developed a radiation detector of the direct conversion type having a solid-state detector for converting a radiation directly into an electric signal and a radiation detector of the indirect conversion type having a scintillator for temporarily converting a radiation into visible light and a solid-state detector for converting the visible light into an electric signal.

As disclosed in Japanese Laid-Open Patent Publication No. 10-225450 and Japanese Laid-Open Patent Publication No. 2007-222604, the radiographic image capturing apparatus are developed on the assumption that they will be used to capture radiographic images of patients in hospitals.

There are potential demands for capturing radiographic images outside hospitals. To meet such demands, radiographic image capturing apparatus mounted on motor vehicles dedicated for medical examination have been proposed in the art. However, the proposed radiographic image capturing apparatus on the medical examination motor vehicles are relatively large in size. Needs have arisen for capturing radiographic images of persons who suffer from natural disasters at the disaster sites or persons who are receiving home-care services at their homes. However, the existing medical checkup motor vehicles cannot be used in the former application as they find it difficult to get to disaster sites. Though the existing medical checkup motor vehicles may be driven to the homes of persons who are receiving home-care services, the image capturing process is highly burdensome to the people to be imaged because they have to be taken from their homes into the medical examination motor vehicle in order to capture radiographic images thereof. Therefore, there have been demands for small-size portable radiographic image capturing apparatus for use at natural disaster sites or homes receiving home-care services.

There has been developed a portable radiographic image capturing apparatus which can be folded into a compact form in its entirety as disclosed in Japanese Laid-Open Patent Publication No. 11-104117. In addition, field-emission-type radiation sources based on the carbon nanotube (CNT) technology have also been proposed as disclosed in Japanese Laid-Open Patent Publication No. 2007-103016 and AIST: Press Release "Development of Portable X-ray Sources Using Carbon Nanostructures" [online], Mar. 19, 2009, National Institute of Advanced Industrial Science and Technology, [retrieved Jul. 8, 2009, Internet <URL: http://www.aist.go.jp/aist_j/press_release/pr2009/pr20090319/pr20090319.html>. It has been expected to have small-size, lightweight radiographic image capturing apparatus including radiation sources, available in the art.

When a radiographic image capturing apparatus including a radiation source is reduced in overall size and weight, it is easy to carry around. Specifically, the doctor or radiological technician in charge carries the radiographic image capturing apparatus in its compactly folded form to a disaster site or a home receiving home-care services. At the disaster site or the home, the doctor or radiological technician assembles the radiographic image capturing apparatus into an operational form so that it is ready to capture radiographic images. After having captured radiographic images, the doctor or radiological technician folds the radiographic image capturing apparatus into the compact form again. The portable radiographic image capturing apparatus needs to be assembled and readied for capturing radiographic images each time it is carried to a different site. Consequently, it is desirable to make the portable radiographic image capturing ready to capture radiographic images simply in a short period of time.

SUMMARY OF THE INVENTION

It is an object of the present invention to provide a radiographic image capturing apparatus and a radiographic image capturing method which can be readied to capture radiographic images simply in a short period of time.

To achieve the above object, a radiographic image capturing apparatus according to the present invention includes a radiation source device housing therein a radiation source for outputting a radiation, a cassette housing therein a radiation detector for detecting the radiation which is transmitted through a subject when the subject is irradiated with the radiation by the radiation source, and converting the detected radiation into a radiographic image, and a joining mechanism for selectively integrally joining the radiation source device and the cassette to each other and separating the radiation source device and the cassette from each other when the radiation source outputs the radiation.

To achieve the above object, a method of capturing a radiographic image according to the present invention includes the steps of moving a radiation source device and a cassette which are integrally joined to each other by a joining mechanism, thereafter, separating the radiation source device and the cassette from each other, outputting a radiation from a radiation source housed in the radiation source device and applying the radiation to a subject, and detecting the radiation which is transmitted through the subject and converting the detected radiation into a radiographic image with a radiation detector housed in the cassette.

According to the present invention, the radiation source device and the cassette which are integrally joined to each other by the joining mechanism are moved. When a radiographic image of the subject is to be captured, the radiation source device and the cassette are separated, and the radiation source housed in the radiation source device outputs and applies the radiation to the subject.

The radiographic image capturing apparatus which is portable is small in size and weight, and can simply and quickly be readied for capturing radiographic images according to a preparatory procedure.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a perspective view of a radiographic image capturing apparatus according to a second embodiment of the present invention;

DESCRIPTION OF THE PREFERRED EMBODIMENTS

Figure 1:
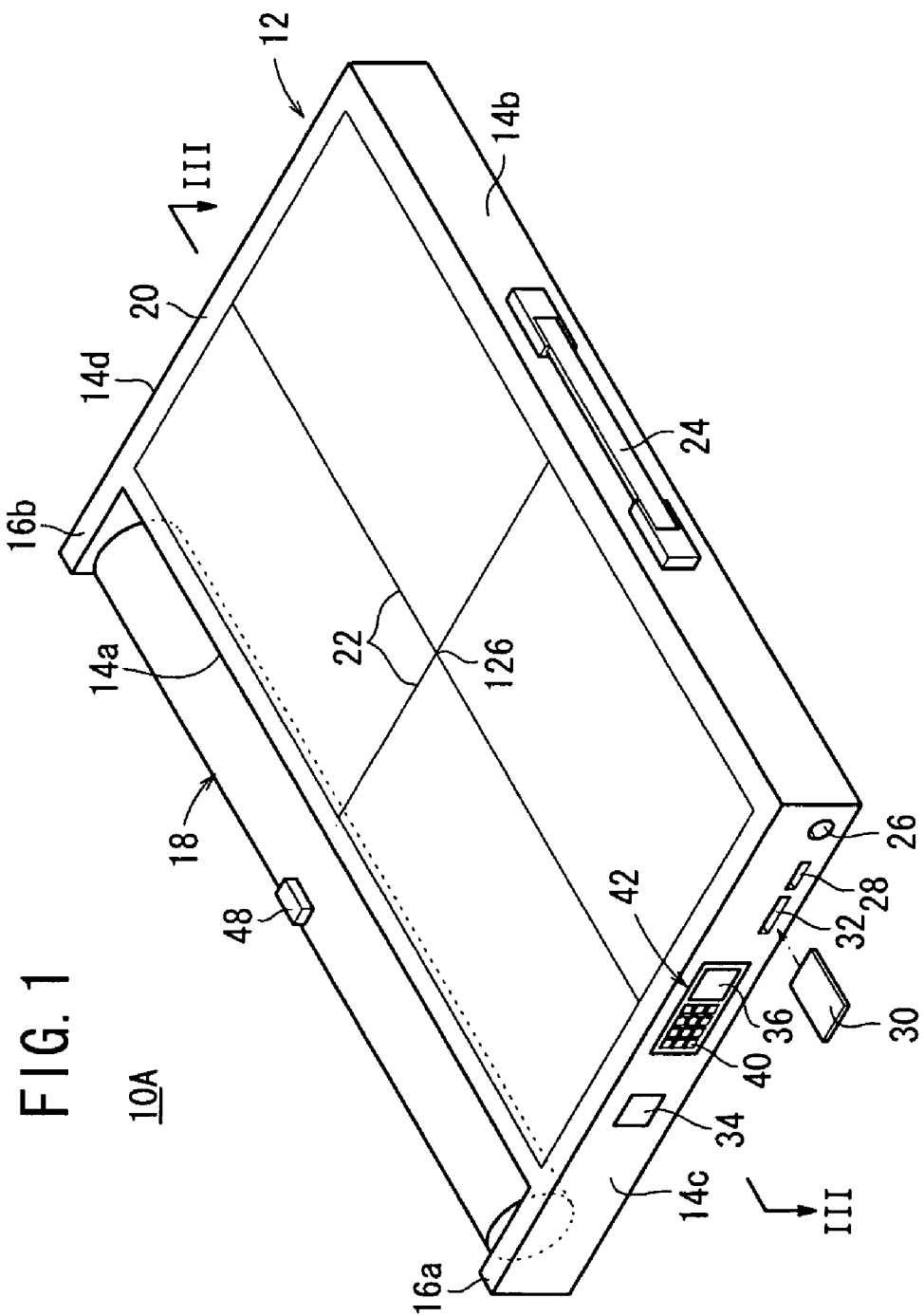
FIG. 1 is a perspective view of a radiographic image capturing apparatus according to a first embodiment of the present invention.
Figure 2:
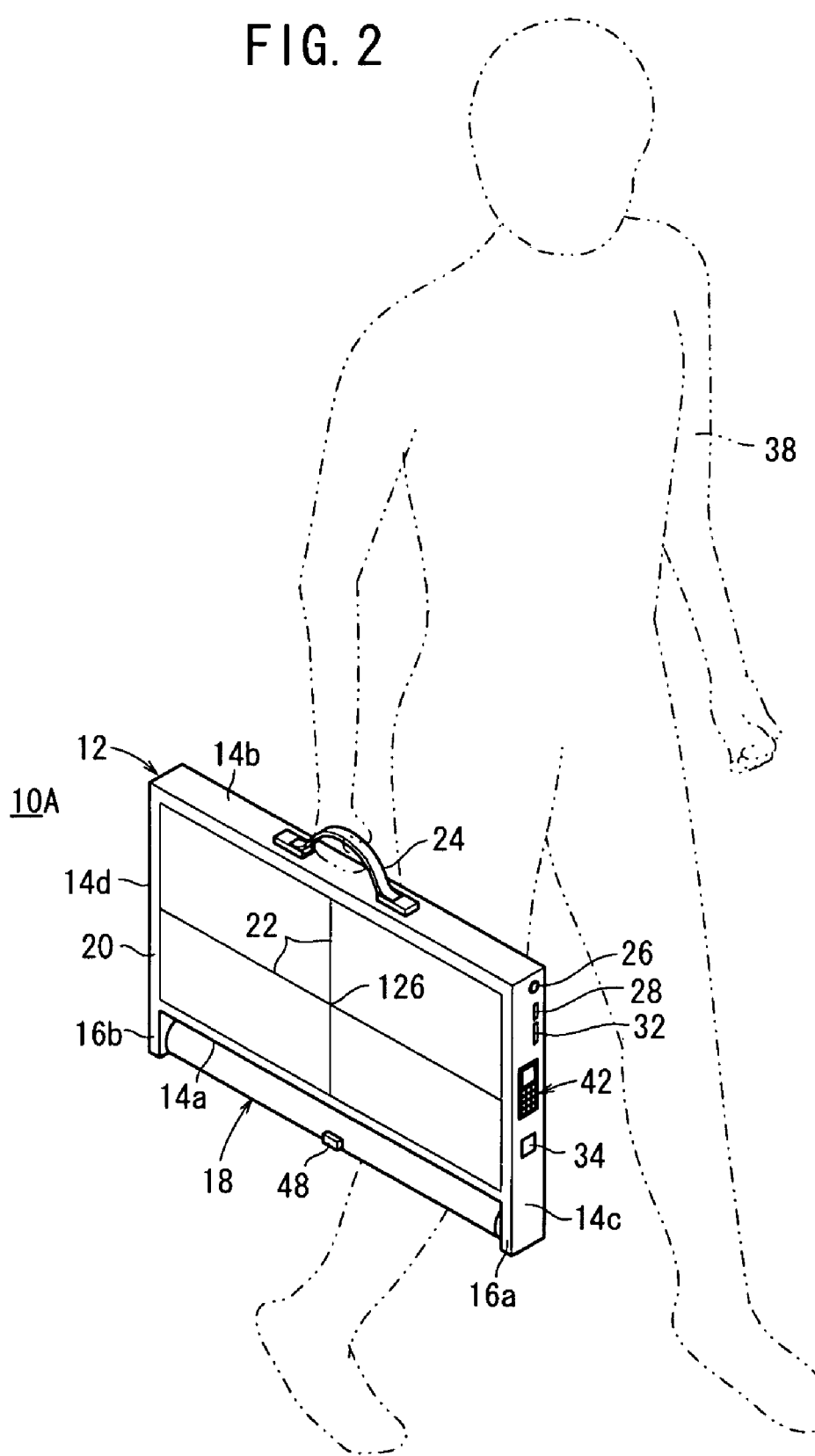
FIG. 2 is a perspective view showing the manner in which the radiographic image capturing apparatus shown in FIG. 1 is carried.

As shown in FIGS. 1 and 2, a radiographic image capturing apparatus 10A according to a first embodiment of the present invention includes a cassette 12 having a substantially rectangular outer contour shaped as a housing and made of a material permeable to a radiation 46 (see FIG. 5), and a cylindrical radiation source device 18 held by the cassette 12 by a pair of holders 16a, 16b projecting outwardly from the opposite ends of one side 14a of the cassette 12.

The cassette 12 has guide lines 22 disposed on a surface (irradiated surface) 20 thereof which serve as a reference for an image capturing area and an image capturing position. The cassette 12 also has a grip 24 on a side 14b thereof remote from the side 14a. The cassette 12 has other two sides 14c, 14d extending perpendicular to and between the sides 14a, 14b which are opposite to each other. On the side 14c, there are disposed an AC adapter input terminal 26, an USB (Universal Serial Bus) terminal 28 as an interface means for sending information to and receiving information from an external device, a card slot 32 for inserting a memory card 30 therein, and an unlock button (unlock unit) 34 to be described later. The side 14c also supports thereon a mobile terminal 42 detachable from the cassette 12. The mobile terminal 42 has a display unit 36 and a control pad 40 operable by the doctor or radiological technician (hereinafter referred to as "operator") 38 who handles the radiographic image capturing apparatus 10A. The radiation source device 18 has an exposure switch 48 which can be operated by the operator 38 to cause a radiation source 44 (see FIGS. 3 through 5), which is to be descried later, to start emitting a radiation 46 (see FIG. 5).

FIGS. 1 and 2 show the radiographic image capturing apparatus 10A which is being carried by the operator 38. When the radiographic image capturing apparatus 10A is carried, the radiation source device 18 and the cassette 12 are integrally joined to each other. The operator 38 grips the grip 24 and carries the radiographic image capturing apparatus 10A to a desired site, such as a disaster site or a home receiving home-care services. When the operator 38 arrives at the site, the operator 38 operates the radiographic image capturing apparatus 10A to capture radiographic images of a victim at the disaster site or a person receiving home-care services at the home. The victim or person whose radiographic images are to be captured will hereinafter be referred to as a subject 50 (see FIG. 6).

When the radiation source device 18 and the cassette 12 are integrally joined to each other, they are secured together by a joining mechanism 82 (see FIG. 3), to be described later, such that the radiographic image capturing apparatus 10A can be carried.

The portable radiographic image capturing apparatus 10A which has been brought to a site such as a disaster site or a home receiving home-care services will be described below with reference to FIGS. 3 through 8.

Figure 3:
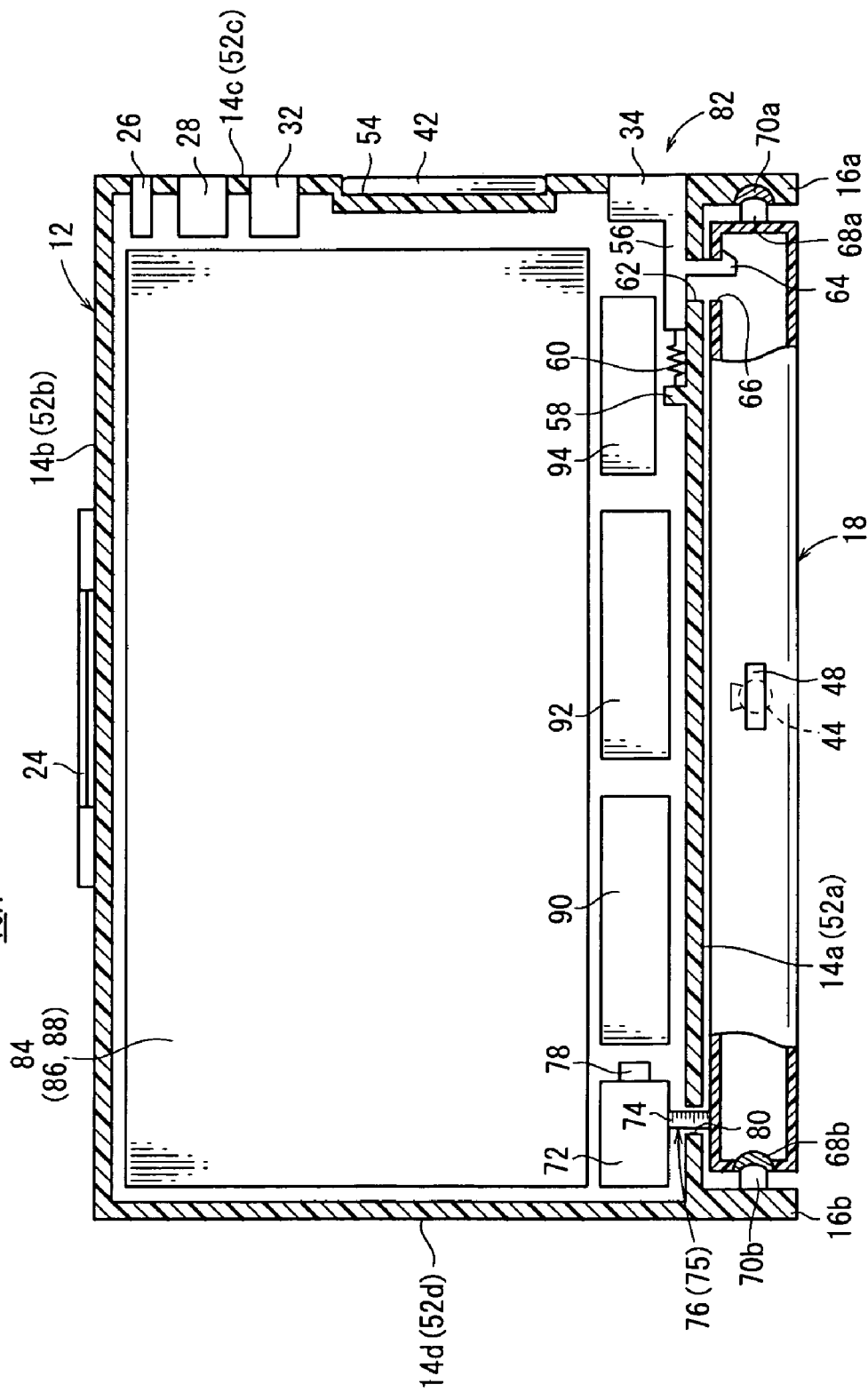
FIG. 3 is a cross-sectional view taken along line III-III of FIG. 1.

As shown in FIG. 3, the sides 14a, 14b, 14c, 14d of the cassette 12 are provided by respective side walls 52a, 52b, 52c, 52d thereof. The input terminal 26, the USB terminal 28, the card slot 32, and the unlock button 34 are provided on the side wall 52c. The side wall 52c has a recess 54 defined between the card slot 32 and the unlock button 34, and the mobile terminal 42 can be placed in the recess 54.

When the unlock button 34 is pressed by the operator 38 (see FIG. 2), it is displaced along the side wall 52a toward the side wall 52d. A slide 56 projects from a surface of the unlock button 34 toward the side wall 52d along the side wall 52a, and a spring 60 acts between the slide 56 and a tooth 58 projecting inwardly from the side wall 52a. The spring 60 normally biases the unlock button 34 to move in a direction from the tooth 58 toward the side wall 52c. The side wall 52a has a through hole 62 defined in a portion thereof against which the slide 56 slides, the through hole 62 being formed from an inner surface of the side wall 52a to an outer surface thereof. The slide 56 has a hook (hook, lock unit) 64 extending through the through hole 62.

Figure 4:
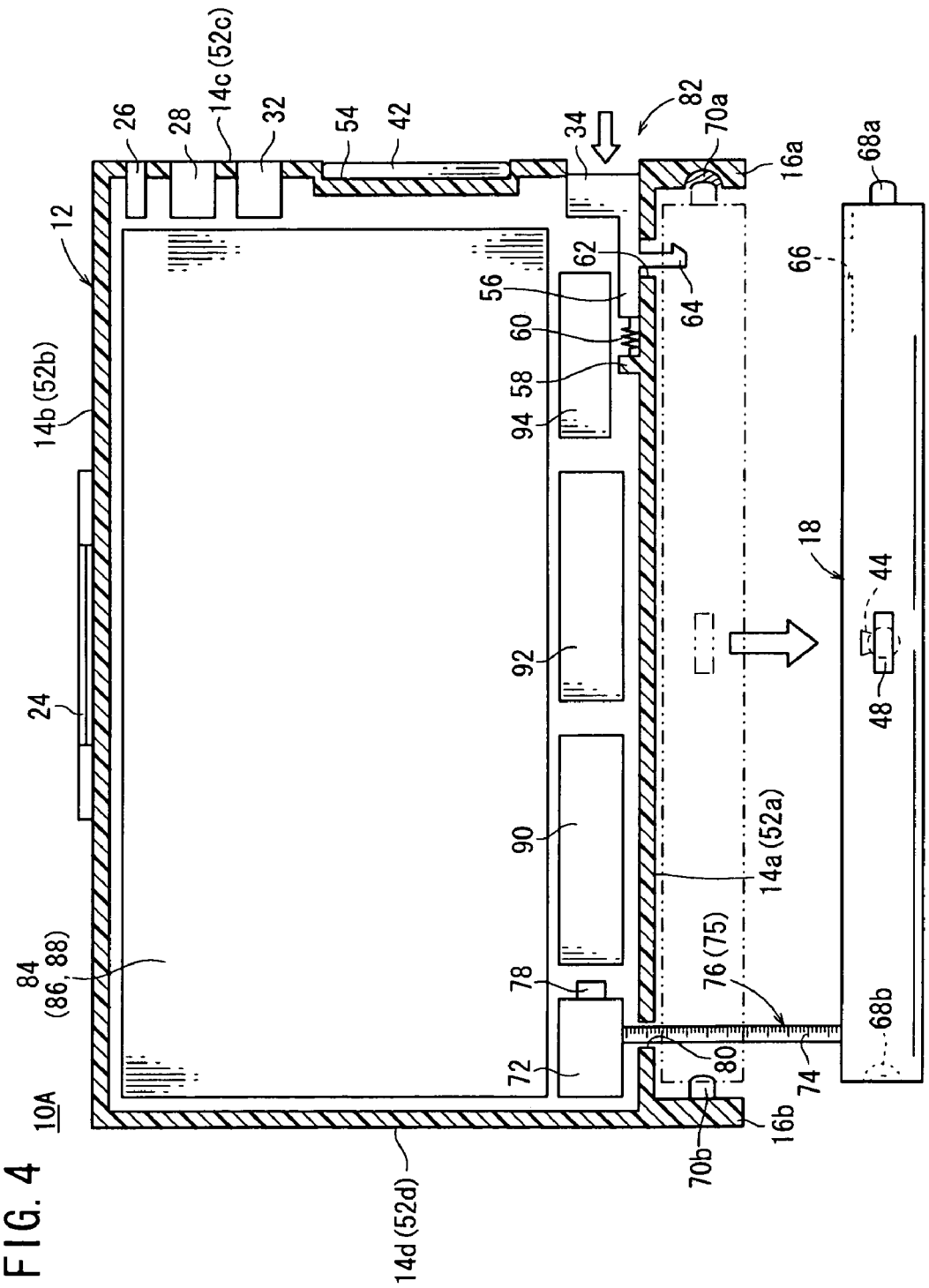
FIG. 4 is a cross-sectional view of the radiographic image capturing apparatus, showing a radiation source device separated from a cassette.

As shown in FIGS. 3 and 4, the radiation source device 18 has a through hole 66 defined therein at a location which is aligned with the hole 62 of the cassette 12 when the radiation source device 18 is held by the cassette 12 by the holders 16a, 16b. The hole 66 is of substantially the same size as the hole 62. When the hook 64 is displaced toward the side wall 52c under the bias of the spring 60, the hook 64 engages an edge of the hole 66 and locks the radiation source device 18, thereby integrally joining the radiation source device 18 to the cassette 12 (see FIG. 3).

The radiation source device 18 has an electrically conductive connection terminal (radiation source connection terminal) 68a mounted on an end thereof which faces the holder 16a, and also has an electrically conductive connection terminal (radiation source connection terminal) 68b mounted on the other end thereof which faces the holder 16b. The connection terminal 68a is convex toward the holder 16a, whereas the connection terminal 68b is concave toward the holder 16b.

The holder 16a has an electrically conductive connection terminal (cassette connection terminal) 70a on a surface thereof which faces the radiation source device 18. The holder 16b has an electrically conductive connection terminal (cassette connection terminal) 70b on a surface thereof which faces the radiation source device 18. The connection terminal 70a is concave complementarily in shape to the convex connection terminal 68a, whereas the connection terminal 70b is convex complementarily in shape to the concave connection terminal 68b.

As shown in FIG. 3, when the hook 64 engages the edge of the hole 66 under the resiliency of the spring 60 to keep the radiation source device 18 and the cassette 12 integrally joined to each other, the convex connection terminal 68a and the concave connection terminal 70a engage each other and the concave connection terminal 68b and the convex connection terminal 70b engage each other. Therefore, the radiation source device 18 and the cassette 12 are securely integrally joined to each other. The connection terminals 68a, 68b, 70a, 70b thus function as members for assisting the hook 64 and the hole 66 in keeping the radiation source device 18 and the cassette 12 integrally joined to each other.

As shown in FIG. 4, when the operator 38 presses the unlock button 34 to move the unlock button 34 toward the side wall 52d against the resiliency of the spring 60, the hook 64 and the slide 56 are displaced toward the side wall 52d to bring the hook 64 out of engagement with the edge of the hole 66. While the hook 64 is kept out of engagement with the edge of the hole 66, i.e., while the operator 38 is pressing the unlock button 34, the operator 38 can remove or separate the radiation source device 18 from the cassette 12, so that the radiation source device 18 and the cassette 12 are released from each other.

The cassette 12 houses therein a tape measure 72 comprising a ribbon (ribbon, joining member) 76 marked with graduations 74 which is coiled into a roll by a spring, not shown, in the tape measure 72. The tape measure 72 is combined with a rotary encoder (reeled-out length detector) 78 on a side thereof for detecting the length by which the ribbon 76 is reeled out of the tape measure 72. The ribbon 76 reeled out of the tape measure 72 extends through a hole 80 that is defined in the side wall 52a at a location facing the tape measure 72, and has its distal end fixed to the radiation source device 18 near the connection terminal 68b.

When the radiation source device 18 and the cassette 12 integrally joined to each other as shown in FIG. 3, most of the ribbon 76 is coiled into a roll in the tape measure 72 under the resiliency of the spring in the tape measure 72. When the radiation source device 18 and the cassette 12 are not integrally joined to each other as shown in FIGS. 4 through 8, the ribbon 76 can be pulled out of the tape measure 72 through the hole 80 by separating the radiation source device 18 away from the cassette 12 against the resiliency of the spring.

The unlock button 34, the slide 56, the spring 60, the hook 64, the connection terminals 68a, 68b, 70a, 70b, and the tape measure 72 jointly make up a joining mechanism 82 for integrally joining the radiation source device 18 and the cassette 12 to each other when the radiographic image capturing apparatus 10A is to be carried around, and also for separating the radiation source device 18 and the cassette 12 from each other when the radiographic image capturing apparatus 10A is to capture radiographic images.

The tape measure 72 comprises the ribbon 76 marked with the graduations 74 in the illustrated embodiment. However, the tape measure 72 may comprise a string (string, joining member) 75 marked with graduations 74, as a functional equivalent to the ribbon 76.

Figure 6:
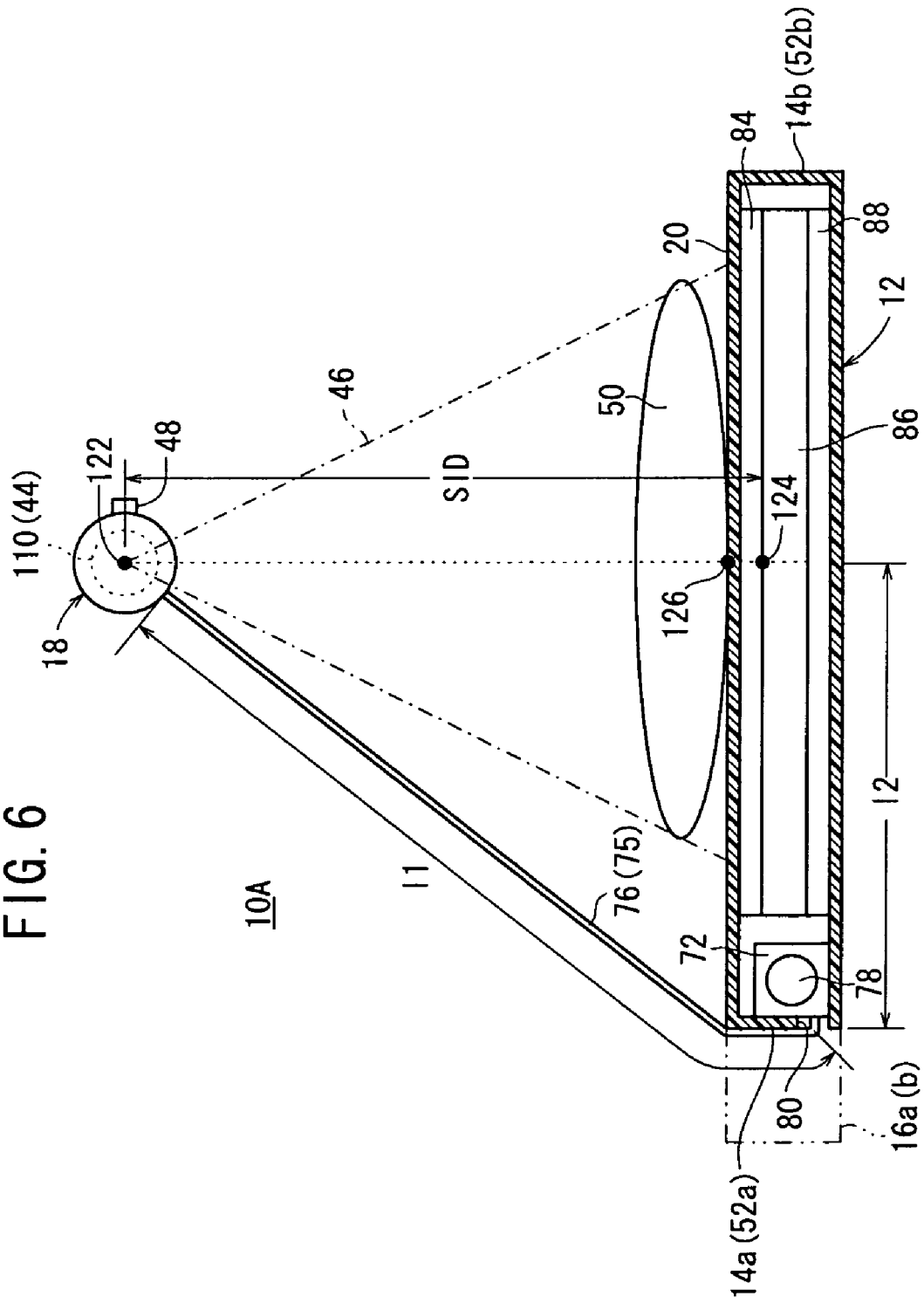
FIG. 6 is an elevational view, partly in cross section, showing the manner in which the radiographic image capturing apparatus shown in FIG. 1 captures a radiographic image.

As shown in FIGS. 3 and 6, the cassette 12 also houses therein a grid 84 for removing scattered rays of the radiation 46 from the subject 50 when the radiation source 44 applies the radiation 46 to the subject 50, a radiation detector 86 for detecting the radiation 46 that has passed through the subject 50, and a lead plate 88 for absorbing back scattered rays of the radiation 46, which are successively arranged in the order named from the irradiated surface 20 of the cassette 12. The irradiated surface 20 of the cassette 12 may be constructed as the grid 84.

The radiation detector 86 may comprise a radiation detector of the indirect conversion type including a scintillator for converting the radiation 46 having passed through the subject 50 into visible light and solid-state detectors (hereinafter also referred to as pixels) such as of amorphous silicon (a-Si) or the like for converting the visible light into an electric signal, or a radiation detector of the direct conversion type comprising solid-state detectors of amorphous selenium (a-Se) or the like for converting the dose of the radiation 46 directly into an electric signal.

As shown in FIG. 3, the cassette 12 also houses therein a battery 90 as a power supply of the radiographic image capturing apparatus 10A including the cassette 12, a cassette controller (control unit, exposure inhibition controller) 92 for controlling the radiation detector 86 (see FIG. 6) with electric power supplied from the battery 90, and a transceiver (communicating means) 94 for sending and receiving signals including the information of the radiation 46 detected by the radiation detector 86, to and from an external circuit. A plate of lead or the like should preferably be placed over the side surfaces of the cassette controller 92 and the transceiver 94 under the irradiated surface 20 to protect the cassette controller 92 and the transceiver 94 against damage which would otherwise be caused if irradiated with the radiation 46.

The battery 90 supplies electric power to the rotary encoder 78, the radiation detector 86, the cassette controller 92, and the transceiver 94 in the cassette 12. The battery 90 can receive electric power from an external circuit through the input terminal 26, so that the battery 90 can be charged by the supplied electric power. The battery 90 can also charge the mobile terminal 42 when the mobile terminal 42 is placed in the recess 54. The battery 90 is electrically connected to the connection terminals 70a, 70b, so that when the radiation source device 18 is integrally joined to the cassette 12, the battery 90 can charge a battery (radiation source battery) 96 (see FIG. 5) in the radiation source device 18 through the connection terminals 70a, 70b, 68a, 68b. The display unit 36 of the mobile terminal 42 should desirably display charged levels and charged states of the battery 90, the mobile terminal 42, and/or the battery 96.

The transceiver 94, which is capable of sending signals to and receiving signals from an external circuit, can send signals to and receive signals from a transceiver 98 (see FIG. 11) of the mobile terminal 42 when the mobile terminal 42 is removed from the recess 54, and also send signals to and receive signals from a transceiver (communicating means) 100 in the radiation source device 18 when the radiation source device 18 is detached from the cassette 12. The transceivers 94, 98, 100 can send signals to and receive signals from each other while the radiation source device 18 and the cassette 12 are integrally joined to each other and/or the mobile terminal 42 is placed in the recess 54.

Figure 5:
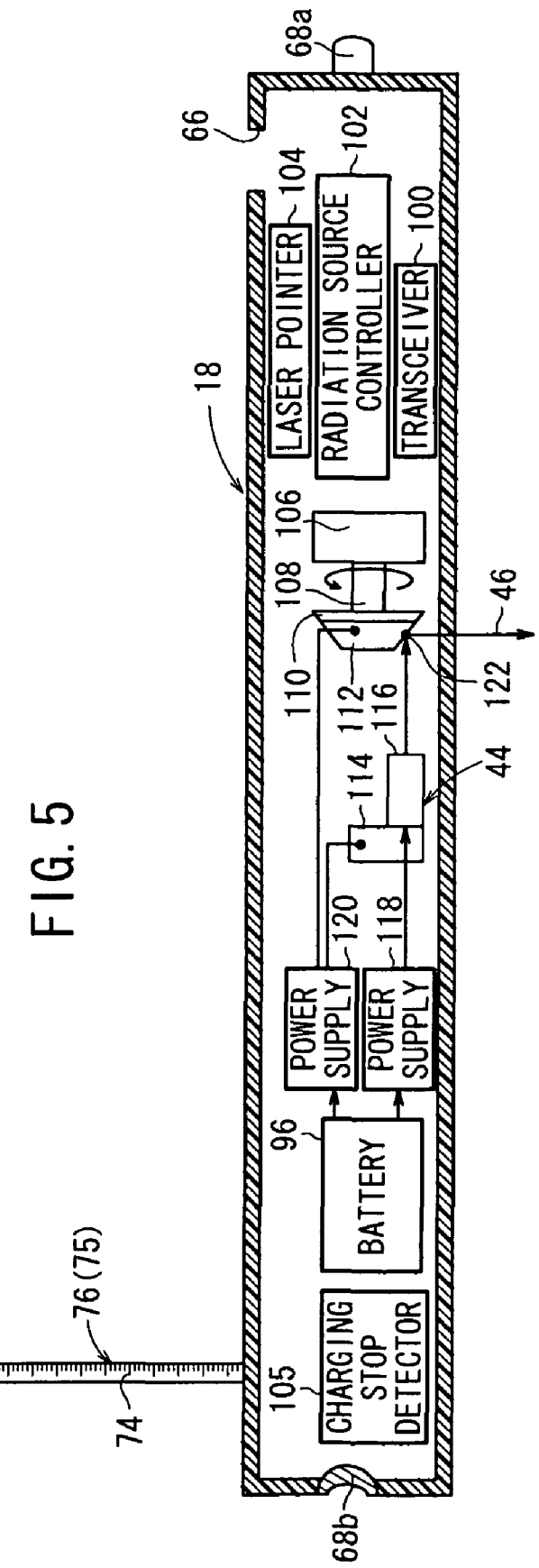
FIG. 5 is a cross-sectional view, partly shown in block form, of internal details of a radiation source device shown in FIG. 1.

As shown in FIG. 5, the radiation source device 18 houses therein a battery 96, a transceiver 100, a radiation source controller (control unit, exposure inhibition controller) 102 for controlling the radiation source 44, a laser pointer 104, and a charging stop detector 105 for detecting when the battery 90 stops charging the battery 96 because of detachment of the radiation source device 18 from the cassette 12.

The radiation source 44 comprises a field-emission-type radiation source similar to the field-emission-type radiation source disclosed in Japanese Laid-Open Patent Publication No. 2007-103016.

The radiation source 44 includes a disk-shaped rotary anode 110 mounted on a rotational shaft 108 that can be rotated about its own axis by a rotating mechanism 106, an annular target layer 112 disposed on the surface of the rotary anode 110 and made mainly of a metallic element of Mo or the like, a cathode 114 disposed in confronting relation to the rotary anode 110, and a field-emission-type electron source 116 disposed on the cathode 114 in confronting relation to the target layer 112.

When the operator 38 operates the exposure switch 48, the radiation source controller 102 controls the radiation source 44 to output the radiation 46. Specifically, when the radiation source 44 is controlled by the radiation source controller 102, the rotating mechanism 106 rotates the rotational shaft 108 to rotate the rotary anode 110. The battery 96 supplies electric power to a power supply 118, which applies a negative voltage to the field-emission-type electron source 116. The battery 96 also supplies electric power to a power supply 120, which applies a voltage between the rotary electrode 110 and the cathode 114, i.e., applies a positive voltage to the rotary electrode 110 and applies a negative voltage to the cathode 114. The field-emission-type electron source 116 emits electrons that are accelerated and bombard the target layer 112 under the voltage applied between the rotary electrode 110 and the cathode 114. The electrons are focused onto a point 122 on the surface of the target layer 112, and the bombarded surface of the target layer 112 emits the radiation 46 from the focused point 122 at an intensity level depending on the applied electrons.

While the radiation source device 18 and the cassette 12 are integrally joined to each other by the joining mechanism 82 (see FIGS. 1 through 3), the radiation source 44 is oriented toward the cassette 12, as shown in FIGS. 3 and 4.

For irradiating the subject 50 with the radiation 46 to capture a radiographic image of the subject 50, it is necessary to perform a preparatory procedure for making the radiographic image capturing apparatus 10A ready to capture a radiographic image. The preparatory procedure includes a process for presetting a source-to-image distance (SID) representing the distance (imaging distance) between the focused point 122 of the radiation source 44 and a position 124 (see FIG. 6) on the radiation detector 86 straight below the focused point 122 and a process for bringing the center of a range in which the irradiated surface 20 is irradiated with the radiation 46 into alignment with a central position 126 of the guide lines 22, i.e., a point of intersection of the criss-crossing guide lines 22.

Figure 7:
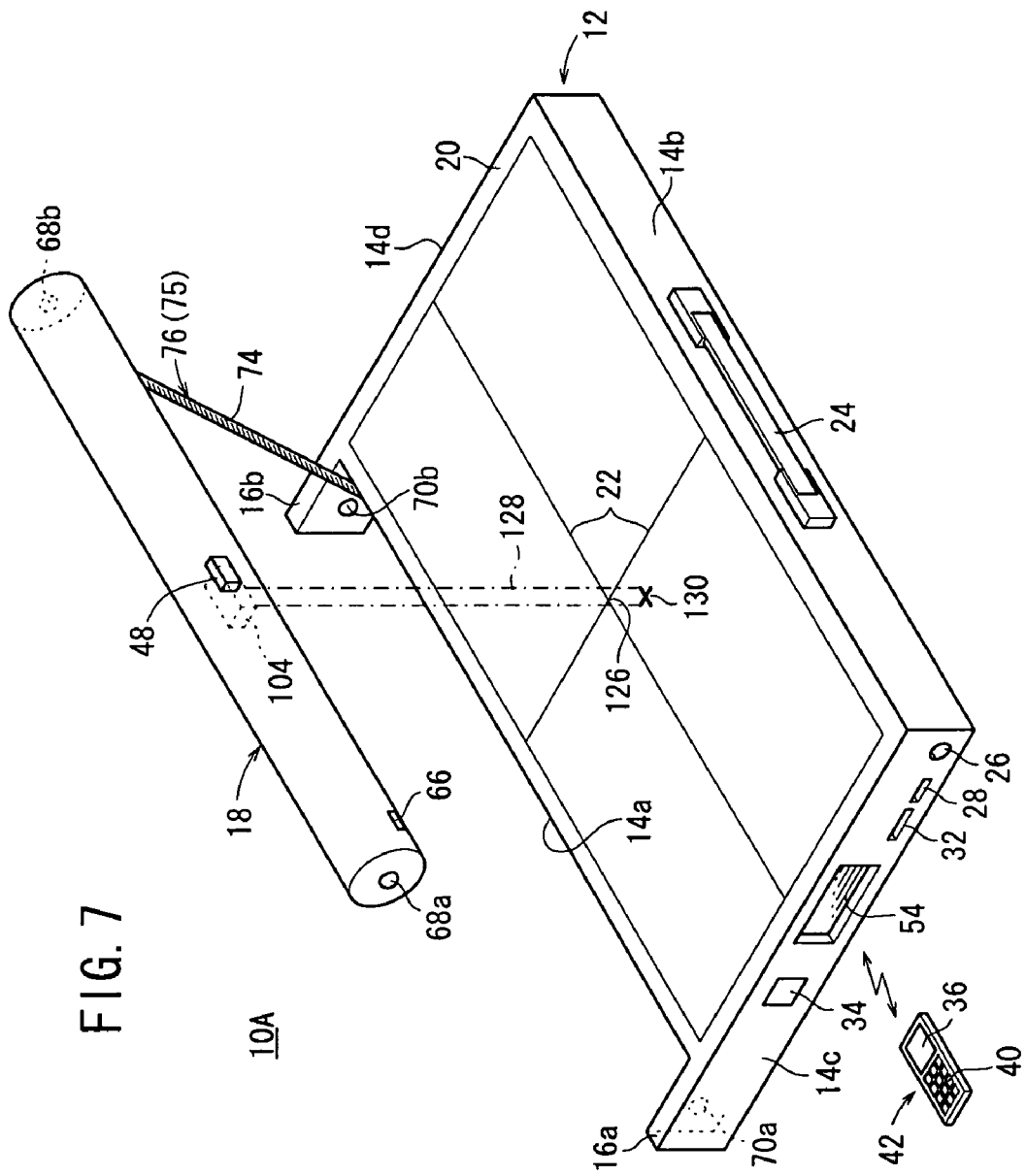
FIG. 7 is an elevational view showing the manner in which the radiographic image capturing apparatus shown in FIG. 1 is being readied to capture a radiographic image.

The preparatory procedure is carried out as follows. As shown in FIGS. 6 and 7, while the radiation source device 18 is being separate from the cassette 12, the operator 38 pulls the ribbon 76 (or the string 75) from the tape measure 72 until the length of the ribbon 76 (or the string 75) which is reeled out of the tape measure 72 becomes equal to a reeled-out length 11 depending on the SID. The laser pointer 104 is controlled by the radiation source controller 102 to apply a laser beam 128 to the irradiated surface 20 thereby to display on the irradiated surface 20 a crisscross mark 130 which represents the center of the range in which the irradiated surface 20 is irradiated with the radiation 46.

Since the battery 90 stops charging the battery 96 when the radiation source device 18 is detached from the cassette 12, the charging stop detector 105 detects when the battery 90 stops charging the battery 96 and sends a signal indicative of the stop of the charging to the radiation source controller 102. In response to the signal from the charging stop detector 105, the radiation source controller 102 controls the laser pointer 104 to emit the laser beam 128.

The charging stop detector 105 sends no signal when the radiation source device 18 and the cassette 12 are integrally joined to each other. At this time, even if the operator 38 turns on the exposure switch 48 in error, the radiation source controller 102 nullifies the turn-on of the exposure switch 48, and does not energize the radiation source 44 and hence inhibits the radiation source 44 from emitting the radiation 46. Inasmuch as the transceivers 94, 100 can send and receive signals therebetween, if the operator 38 turns on the exposure switch 48 in error when the radiation source device 18 and the cassette 12 are integrally joined to each other, then the cassette controller 92 may inhibit the radiation source 44 from emitting the radiation 46 through the transceivers 94, 100 and the radiation source controller 102.

The SID, the reeled-out length 11 depending on the SID, and a distance 12 between the position 124 or the central position 126 and the side 14a which has the hole 80 through which the ribbon 76 (or the string 75) is pulled out are related to each other according to the equation: $SID \approx (11^2 + 12^2)^{1/2}$. The distance 12 is constant.

Figure 8:
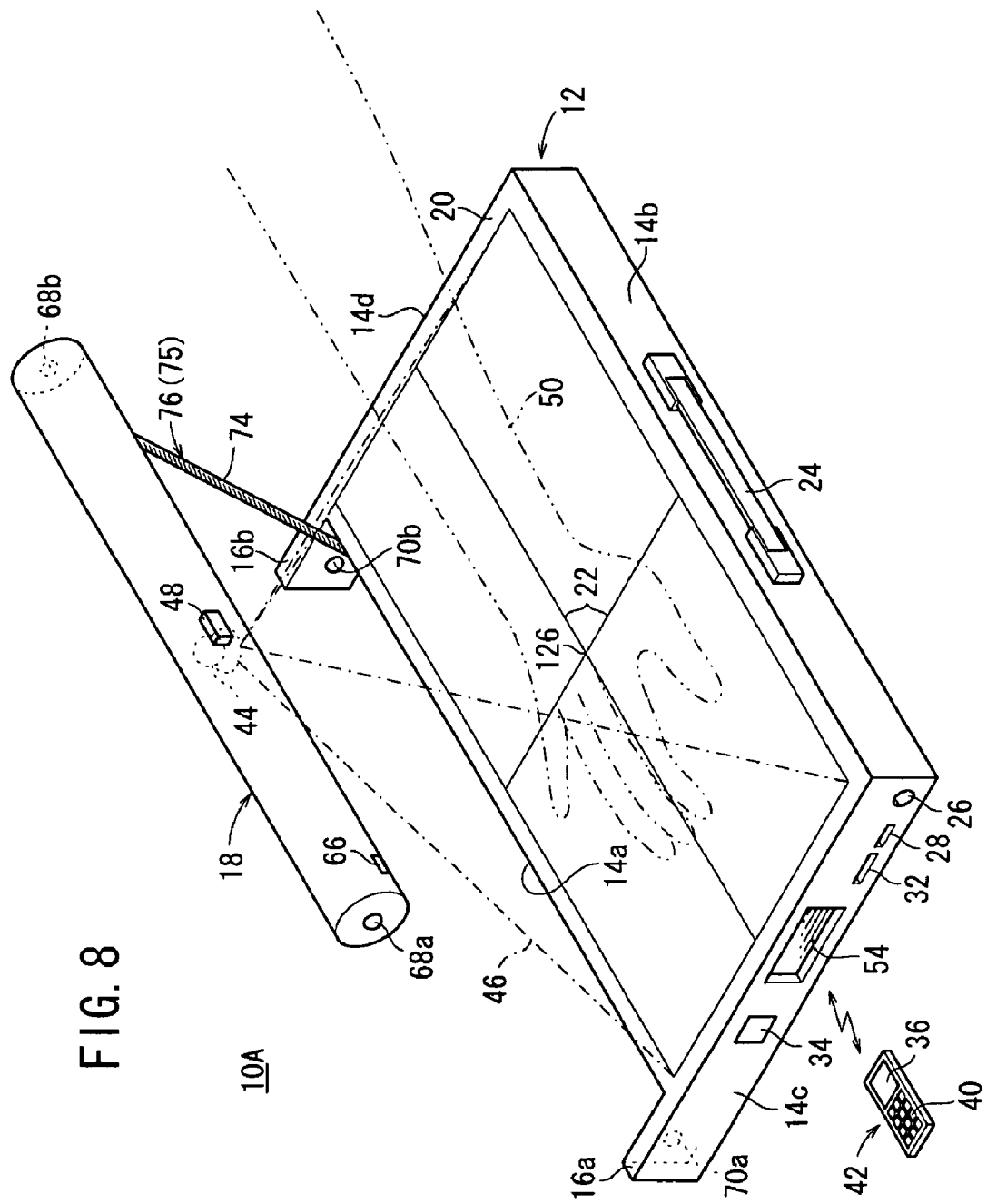
FIG. 8 is an elevational view showing the manner in which the radiographic image capturing apparatus captures a radiographic image.

After the ribbon 76 (or the string 75) is pulled from the tape measure 72 by the reeled-out length 11, the operator 38 positionally adjusts the radiation source device 18 to bring the mark 130 displayed on the irradiated surface 20 into alignment with the central position 126. Thereafter, the operator 38 turns on the exposure switch 48 to enable the radiation source 44 to apply the radiation 46 to the subject 50 on the irradiated surface 20, thereby capturing a radiographic image of the subject 50, as shown in FIG. 8. In FIG. 8, a radiographic image of a hand of the subject 50 is captured.

Figure 9:
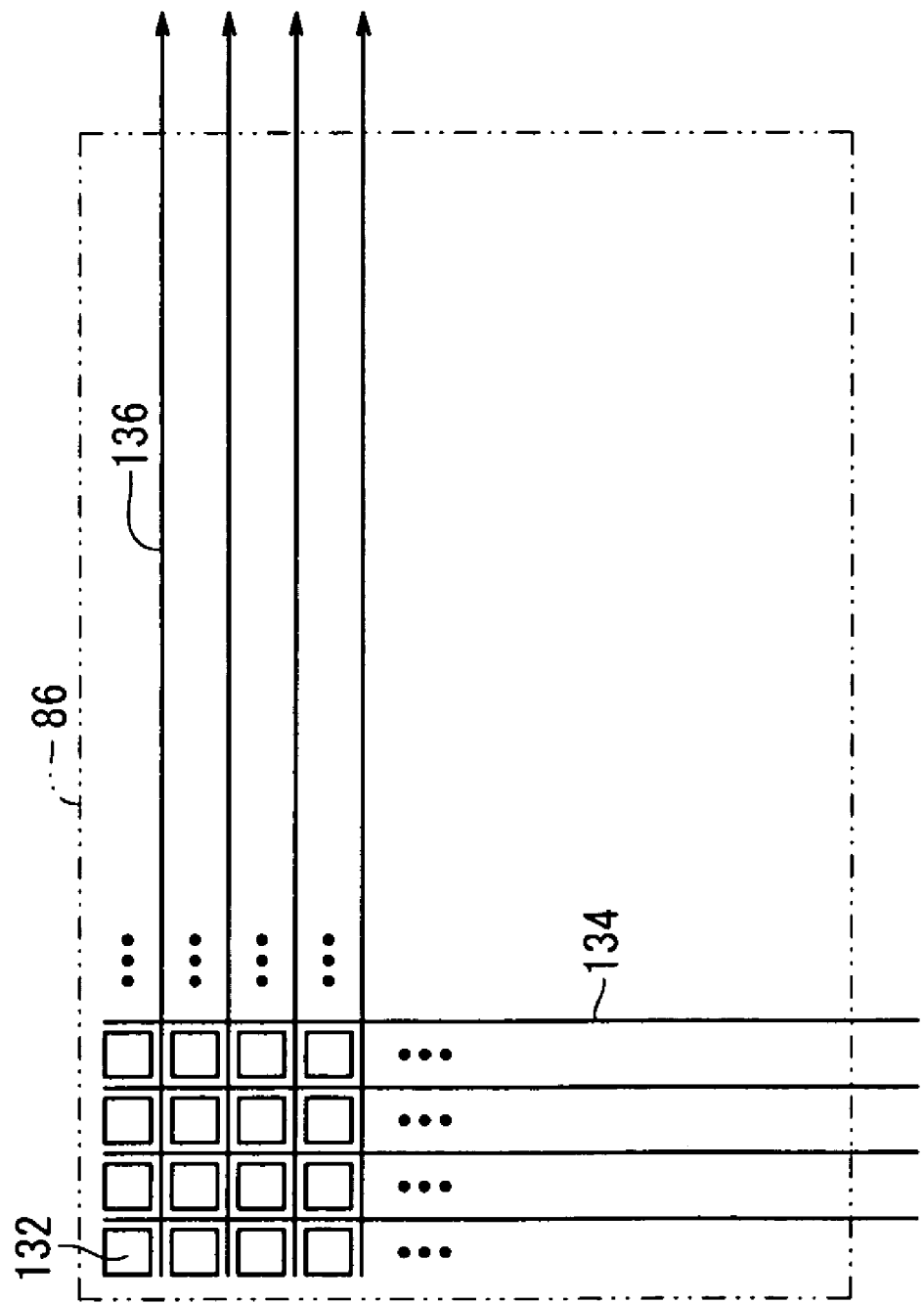
FIG. 9 is a schematic view showing an array of pixels of a radiation detector of the radiographic image capturing apparatus shown in FIG. 1.

As shown in FIG. 9, the radiation detector 86 comprises a number of pixels 132 arrayed on a substrate, not shown, a number of gate lines 134 for supplying control signals to the pixels 132, and a number of signal lines 136 for reading electric signals output from the pixels 132.

A circuit arrangement of the radiation detector 86, which is of the indirect conversion type, for example, that is housed in the cassette 12 will be described in detail below with reference to FIG. 10.

Figure 10:
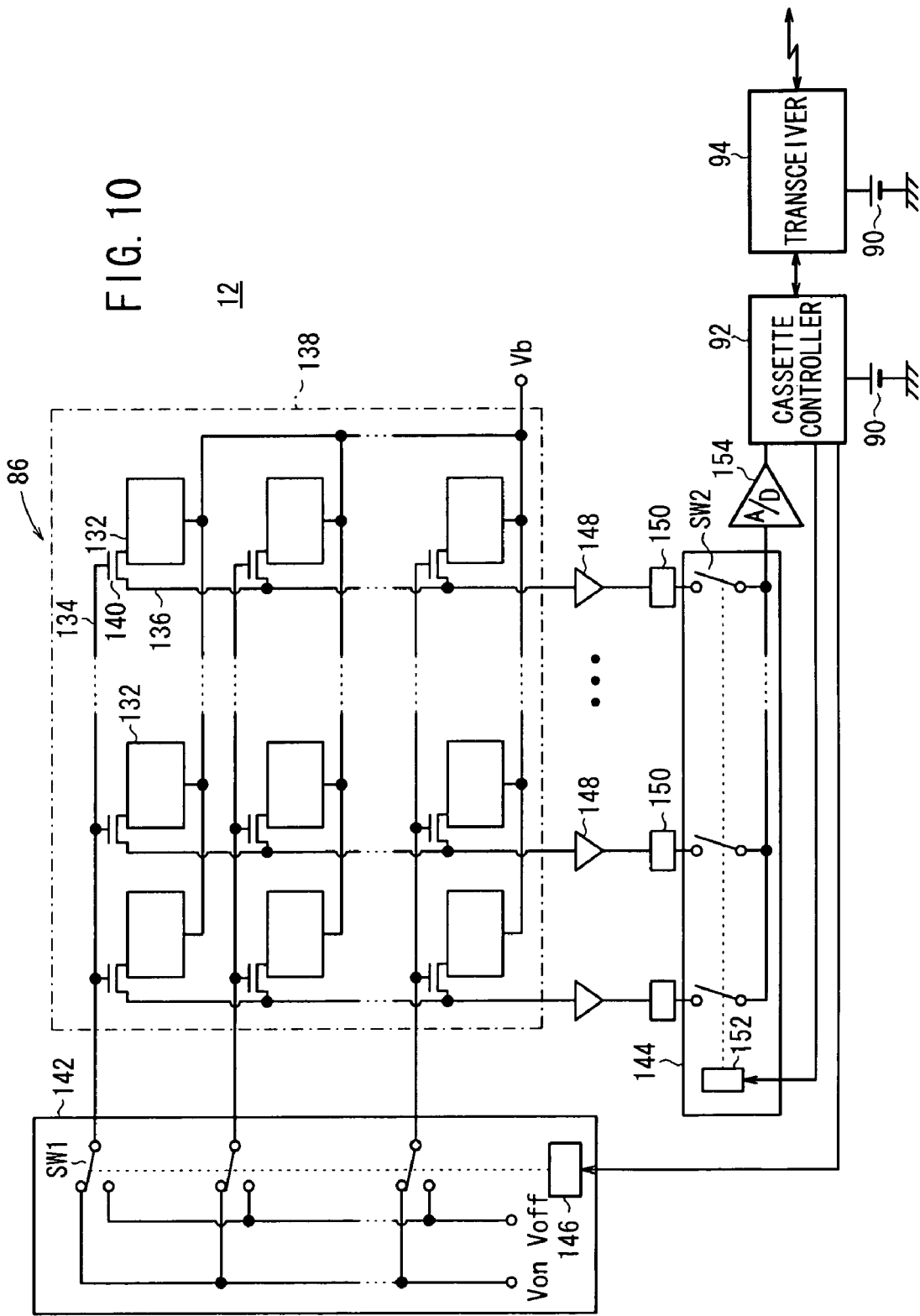
FIG. 10 is a block diagram of a circuit arrangement of the radiation detector in the cassette.

As shown in FIG. 10, the radiation detector 86 comprises an array of thin-film transistors (TFTs) 140 arranged in rows and columns and a photoelectric conversion layer 138 including the pixels 132 and made of a material such as amorphous silicon (a-Si) or the like for converting visible light into electric signals, the photoelectric conversion layer 138 being disposed on the array of TFTs 140. When the radiation 46 is applied to the radiation detector 86, the pixels 132 generate electric charges by converting visible light into analog electric signals. Then, when the TFTs 140 are turned on along each row at a time, the electric charges are read from the pixels 132 as an image signal.

The TFTs 140 are connected to the respective pixels 132. The gate lines 134 which extend parallel to the rows and the signal lines 136 which extend parallel to the columns are connected to the TFTs 140. The gate lines 134 are connected to a line scanning driver 142, and the signal lines 136 are connected to a multiplexer 144. The gate lines 134 are supplied with control signals Von, Voff for turning on and off the TFTs 140 along the rows from the line scanning driver 142. The line scanning driver 142 comprises a plurality of switches SW1 for switching between the gate lines 134 and an address decoder 146 for outputting a selection signal for selecting one of the switches SW1 at a time. The address decoder 146 is supplied with an address signal from the cassette controller 92.

The signal lines 136 are supplied with electric charges stored by the pixels 132 through the TFTs 140 arranged in the columns. The electric charges supplied to the signal lines 136 are amplified by amplifiers 148 connected respectively to the signal lines 136. The amplifiers 148 are connected through respective sample and hold circuits 150 to the multiplexer 144. The multiplexer 144 comprises a plurality of switches SW2 for successively switching between the signal lines 136 and an address decoder 152 for outputting a selection signal for selecting one of the switches SW2 at a time. The address decoder 152 is supplied with an address signal from the cassette controller 92. The multiplexer 144 has an output terminal connected to an A/D converter 154. A radiographic image signal generated by the multiplexer 144 based on the electric charges from the sample and hold circuits 150 is converted by the A/D converter 154 into a digital image signal representing radiographic image information, which is supplied to the cassette controller 92.

The TFTs 140 which function as switching devices may be combined with another image capturing device such as a CMOS (Complementary Metal-Oxide Semiconductor) image sensor or the like. Alternatively, the TFTs 140 may be replaced with a CCD (Charge-Coupled Device) image sensor for shifting and transferring electric charges with shift pulses which correspond to gate signals in the TFTs.

Figure 11:
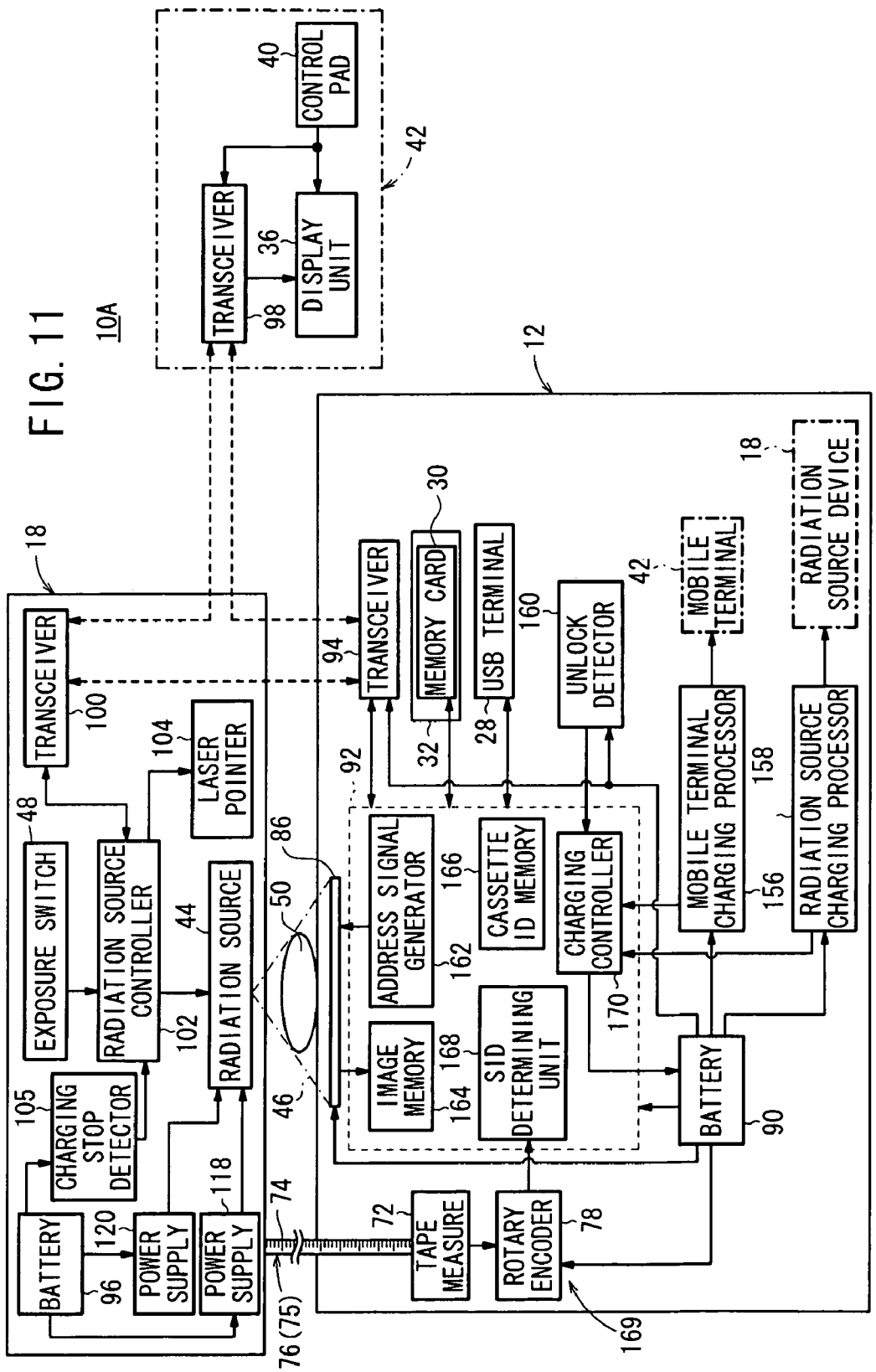
FIG. 11 is a block diagram of the radiographic image capturing apparatus shown in FIG. 1.

FIG. 11 shows in block form the radiographic image capturing apparatus 10A. Those components of the radiographic image capturing apparatus 10A which have not been described above with reference to FIGS. 1 through 10 will mainly be described below with reference to FIG. 11.

The cassette 12 also houses therein a mobile terminal charging processor 156 for charging the mobile terminal 42 placed in the recess 54 with the electric power supplied from the battery 90, a radiation source charging processor 158 for charging the battery 96 through the connection terminals 68a, 68b, 70a, 70b with the electric power supplied from the battery 90, and an unlock detector 160 for detecting when the operator 38 presses the unlock button 34 to bring the hook 64 out of engagement with the edge of the hole 66.

When the mobile terminal 42 is removed from the recess 54 and hence cannot be charged, the mobile terminal charging processor 156 outputs a signal representative of an interruption of the charging process on the mobile terminal 42 to the cassette controller 92. When the radiation source device 18 is detached from the cassette 12, disengaging (electrically disconnecting) the connection terminal 68a from the connection terminal 70a or disengaging (electrically disconnecting) the connection terminal 68b from the connection terminal 70b, and hence the battery 96 cannot be charged, the radiation source charging processor 158 outputs a signal representative of an interruption of the charging process on the battery 96 to the cassette controller 92. The unlock detector 160 is a position detecting sensor for detecting the position of the unlock button 34, the slide 56, or the hook 64. When the unlock button 34, the slide 56, or the hook 64 moves to a position where the hook 64 disengages from the edge of the hole 66, the unlock detector 160 outputs a signal representative of the disengagement of the hook 64 from the edge of the hole 66 to the cassette controller 92.

The cassette controller 92 comprises an address signal generator 162, an image memory 164, a cassette ID memory 166, an SID determining unit (imaging distance determining unit) 168, and a charging controller 170.

The address signal generator 162 supplies address signals to the address decoder 146 of the line scanning driver 142 and the address decoder 152 of the multiplexer 144. The image memory 164 stores radiographic image information detected by the radiation detector 86. The cassette ID memory 166 stores cassette ID information for identifying the radiographic image capturing apparatus 10A or specifically, the cassette 12 thereof.

The SID determining unit 168 calculates the imaging distance between the focused point 122 and the position 124 at the time the radiation source device 18 is tentatively placed over the irradiated surface 20 according to the present reeled-out length of the ribbon 76 (or the string 75), based on the reeled-out length of the ribbon 76 (or the string 75) which is input from the rotary encoder 78 and the distance 12 which has been stored.

Then, if the calculated imaging distance agrees with the SID, the SID determining unit 168 controls the display unit 36 through the transceivers 94, 98 to display information representing the present reeled-out length of the ribbon 76 (or the string 75) as the reeled-out length 11 depending on the SID and also representing that the imaging distance has agreed with the SID. If the calculated imaging distance does not agree with the SID, then the SID determining unit 168 controls the display unit 36 through the transceivers 94, 98 to display information representing the difference between the present reeled-out length and the reeled-out length 11 and also representing that the imaging distance has not agreed with the SID.

The SID determining unit 168, the rotary encoder 78, and the tape measure 72 jointly make up an imaging distance setting means 169.

The charging controller 170 mainly controls the supply of electric power from the battery 90 to the radiation detector 86, i.e., the application of a bias voltage Vb shown in FIG. 10 to the radiation detector 86.

Specifically, the charging controller 170 carries out the following control process:

(1) In the absence of signals from the radiation source charging processor 158 and the unlock detector 160, the charging controller 170 judges that the radiation source device 18 and the cassette 12 are integrally joined to each other and the radiation source 44 does not apply the radiation 46 (non-applied state), and controls the battery 90 not to supply electric power to the radiation detector 86.

(2) If a signal is supplied from the radiation source charging processor 158 or the unlock detector 160, then the charging controller 170 judges that the operator 38 is in the process of detaching the radiation source device 18 from the cassette 12, and controls the battery 90 not to supply electric power to the radiation detector 86.

(3) If signals are supplied from the radiation source charging processor 158 and the unlock detector 160, then the charging controller 170 judges that the operator 38 has detached the radiation source device 18 from the cassette 12 and is performing the preparatory procedure, and controls the battery 90 to supply electric power to the radiation detector 86 to activate the radiation detector 86.

Specifically, in the case of (1) or (2) above, as the radiation source 44 does not output the radiation 46, the charging controller 170 inhibits the battery 90 from supplying electric power to the radiation detector 86 and maintain the entire of the cassette 12 in a sleep mode in which the radiation detector 86 is not activated. In the case of (3), since the operator 38 may turn on the exposure switch 48 immediately after the preparatory procedure is completed, possibly outputting the radiation 46 from the radiation source 44, the charging controller 170 starts supplying electric power from the battery 90 to the radiation detector 86 to activate the radiation detector 86 immediately when the charging controller 170 is supplied with signals from the radiation source charging processor 158 and the unlock detector 160.

Irrespectively of whether the cassette 12 is in the sleep mode or not and whether the radiation detector 86 is activated or not, the battery 90 supplies electric power at all times to the rotary encoder 78, the cassette controller 92, the transceiver 94, the mobile terminal charging processor 156, the radiation source charging processor 158, and the unlock detector 160.

If a signal is supplied from the mobile terminal charging processor 156, then the charging controller 170 judges that the mobile terminal 42 is detached from the cassette 12 and may control the battery 90 not to supply electric power to the mobile terminal charging processor 156.

In the case of (1) or (2), furthermore, the ribbon 76 (or the string 75) is not practically reeled out from the tape measure 72, and hence the charging controller 170 may control the battery 90 not to supply electric power to the rotary encoder 78. In the case of (3), the charging controller 170 may control the battery 90 to supply electric power to the rotary encoder 78.

The cassette controller 92 may transmit the cassette ID information stored in the cassette ID memory 166 and the radiographic image information stored in the image memory 164, via the transceiver 94 to the mobile terminal 42 by way of wireless communications.

The radiographic image capturing apparatus 10A according to the first embodiment of the present invention is basically constructed as described above. Operation of the radiographic image capturing apparatus 10A to carry out a radiographic image capturing method will be described below with reference to a flowchart shown in FIG. 12. It is assumed the ribbon 76 is reeled out from the tape measure 72 in the flowchart shown in FIG. 12. However, the string 75 may be reeled out from the tape measure 72, and the description of the flowchart shown in FIG. 12 is equally applicable if the string 75 is reeled out from the tape measure 72 except that the word "ribbon" is to be replaced with the word "string".

Figure 12:
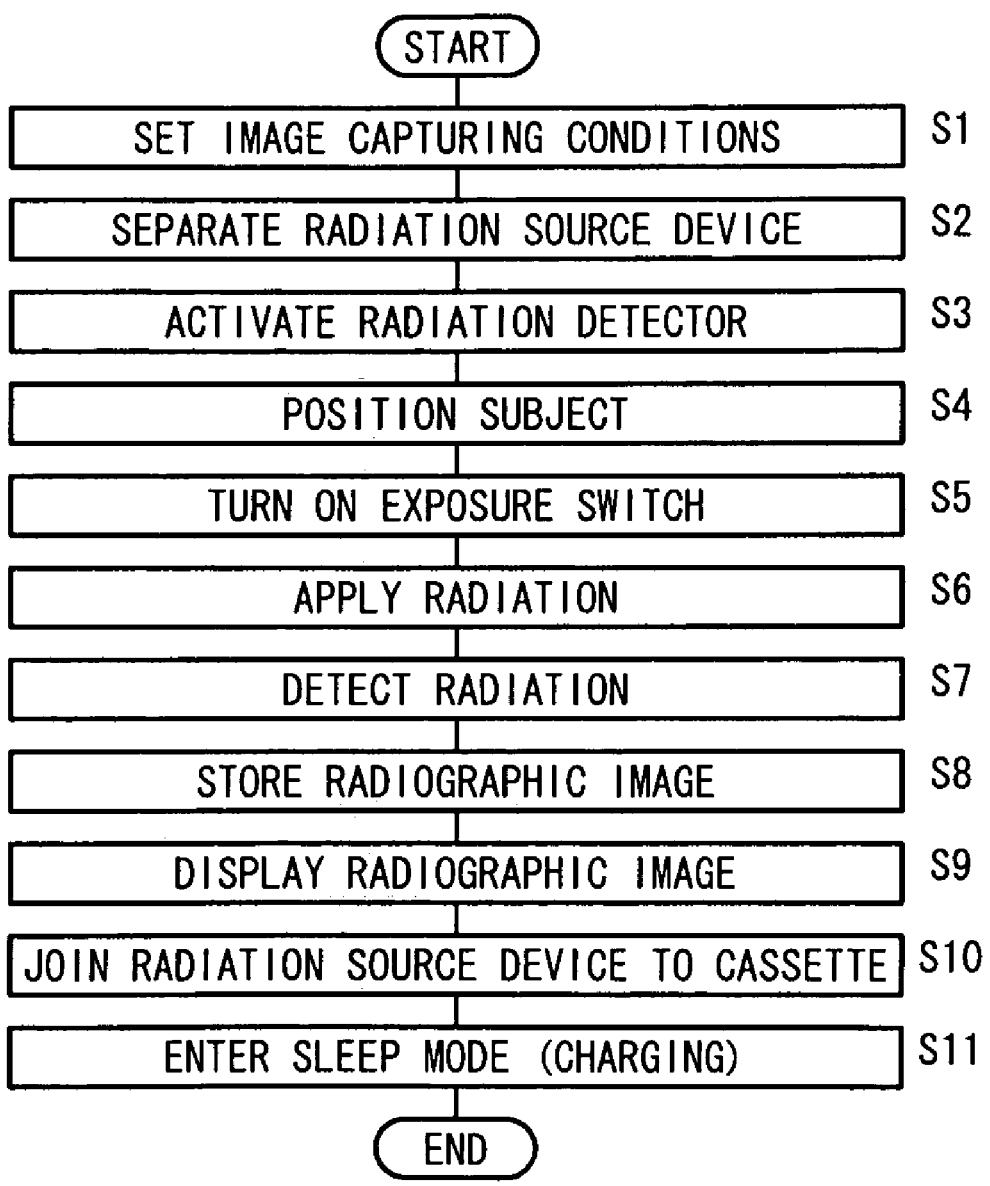
FIG. 12 is a flowchart of an image capturing sequence of the radiographic image capturing apparatus shown in FIG. 1.

In step S1 shown in FIG. 12, while the radiation source device 18 and the cassette 12 are being integrally joined to each other by the joining mechanism 82, the operator 38, a doctor or a radiological technician, grips the grip 24 of the radiographic image capturing apparatus 10A and carries the radiographic image capturing apparatus 10A to a disaster site or a home receiving home-care services. At the disaster site or the home, the operator 38 operates the control pad 40 of the mobile terminal 42 to register image capturing conditions including subject information (e.g., SID) of the subject 50 to be imaged.

At this time, the operator 38 may operate the control pad 40 while the mobile terminal 42 is either detached from the recess 54 or placed in the recess 54 in the cassette 12. If a body region to be imaged and an image capturing method are known, then the operator 38 also operates the control pad 40 to register them as image capturing conditions. If details of the subject 50 are already known before the operator 38 carries the radiographic image capturing apparatus 10A to the disaster site or the home, then the operator 38 may register subject information including those details using the mobile terminal 42 at a medical organization, e.g., a hospital, to which the operator 38 belongs.

Upon operation on the control pad 40 by the operator, the registered image capturing conditions including the subject information of the subject 50 are sent from the transceiver 98 of the mobile terminal 42 to the transceiver 94 of the cassette 12 by way of wireless communications, and then registered in the cassette controller 92.

In step S1, the cassette 12 is in the sleep mode in which the charging controller 170 inhibits the battery 90 from supplying electric power to the radiation detector 86. The battery 90 supplies electric power to the rotary encoder 78, the cassette controller 92, the transceiver 94, the mobile terminal charging processor 156, the radiation source charging processor 158, and the unlock detector 160. Since the radiation source controller 102 is not supplied with a signal from the charging stop detector 105, even if the operator 38 turns on the exposure switch 48 in error, the radiation source controller 102 nullifies the turn-on operation on the exposure switch 48, and inhibits the radiation source 44 from emitting the radiation 46, i.e., does not energize the radiation source 44.

In step S2, when the operator 38 presses the unlock button 34, the hook 64 is displaced toward the side wall 52d against the resiliency of the spring 60 until the hook 64 is brought out of engagement with the edge of the hole 66. The unlock detector 160 detects the disengagement of the hook 64 from the edge of the hole 66, and outputs a signal that is indicative of the disengagement to the charging controller 170.

If the operator 38 detaches the radiation source device 18 from the cassette 12 while the hook 64 is not engaging with the edge of the hole 66, i.e., while the operator 38 is pressing the unlock button 34, then the connection terminal 68a disengages from the connection terminal 70a and the connection terminal 68b disengages from the connection terminal 70b, releasing the radiation source device 18 and the cassette 12 from each other. The radiation source charging processor 158 outputs a signal representative of an interruption of the charging process on the battery 96 of the radiation source device 18 to the charging controller 170.

In step S3, the charging controller 170 judges that the operator 38 has detached the radiation source device 18 from the cassette 12 and started the preparatory procedure based on the signals from the unlock detector 160 and the radiation source charging processor 158, and controls the battery 90 to start supplying electric power to the radiation detector 86, i.e., applying the bias voltage Vb to the radiation detector 86. When supplied from the electric power from the battery 90, the radiation detector 86 is quickly activated, activating the cassette 12 in its entirety from the sleep mode.

In step S4, the operator 38 sets the imaging distance and brings the mark 130 displayed on the irradiated surface 20 into alignment with the central position 126 of the guide lines 22. Thereafter, the operator 38 places and positions the subject 50 between the irradiated surface 20 and the radiation source device 18.

The operator 38 move the radiation source device 18 to reel out the ribbon 76 from the tape measure 72 until the actual reeled-out length of the ribbon 76 reaches the reeled-out length 11 depending on the SID.

The ribbon 76 may be reeled out from the tape measure 72 until the actual reeled-out length of the ribbon 76 reaches the reeled-out length 11 according to either one of two processes to be described below.

According to the first process, the SID determining unit 168 automatically determines whether the actual reeled-out length of the ribbon 76 reaches the reeled-out length 11 or not, and hence allows the operator 38 to reel out the ribbon 72 from the tape measure 72 until the actual reeled-out length of the ribbon 76 reaches the reeled-out length 11 depending on the SID.

In the first process, the rotary encoder 78 detects the actual reeled-out length of the ribbon 76, and the SID determining unit 168 calculates the imaging distance between the focused point 122 and the position 124 at the time the radiation source device 18 is tentatively placed over the irradiated surface 20 according to the present reeled-out length of the ribbon 76 based on the detected reeled-out length.

If the imaging distance agrees with the SID, then the SID determining unit 168 controls the display unit 36 via the transceivers 94, 98 to display information representing the reeled-out length (11) of the ribbon 76 and also representing that the imaging distance agrees with the SID. If the imaging distance does not agree with the SID, then the SID determining unit 168 controls the display unit 36 via the transceivers 94, 98 to display information representing the difference between the present reeled-out length and the reeled-out length 11 and also representing that the imaging distance has not agreed with the SID.

The first process allows the operator 38 to set the imaging distance easily because the operator 38 may reel out the ribbon 76 from the tape measure 72 according to the information displayed on the display unit 36.

According to the second process, the reeled-out length 11 is known, and the operator 38 reels out the ribbon 76 from the tape measure 72 until the present reeled-out length reaches the reeled-out length 11, while seeing the graduations 74.

After the ribbon 76 is reeled out from the tape measure 72 until the present reeled-out length reaches the reeled-out length 11 depending on the SID, the operator 38 moves the radiation source device 18 into facing relationship to the irradiated surface 20.

The charging stop detector 105 detects when the battery 90 stops charging the battery 96 because of detachment of the radiation source device 18 from the cassette 12, and sends a signal indicative of the detection to the radiation source controller 102. Based on the signal from the charging stop detector 105, the radiation source controller 102 controls the laser pointer 104 to apply a laser beam 128 to the irradiated surface 20, and cancels the nullification of the turn-on operation on the exposure switch 48, allowing the operator 38 to operate the exposure switch 48. The crisscross mark 130 which represents the center of the range in which the irradiated surface 20 is irradiated with the radiation 46 is now displayed on the irradiated surface 20. The operator 38 positionally adjusts the radiation source device 18 until the mark 130 and the central position 126 are aligned with each other.

After having positionally adjusted the radiation source device 18 until the mark 130 and the central position 126 are aligned with each other, the operator 38 places or positions the subject 50 on the irradiated surface 20 so that the center of a body region to be imaged of the subject 50 is aligned with the central position 126, i.e., the position of the mark 130.

After the above positional adjustment, the radiation source device 18 is secured to the adjusted position by a holder, not shown, for example.

In step S5 after the subject 50 is positioned, the operator 38 turns on the exposure switch 48 to start capturing a radiographic image of the subject 50.

When the exposure switch 48 is turned on, the radiation source controller 102 sends a request for image capturing conditions to the cassette controller 92 by way of wireless communications. Based on the request, the cassette controller 92 sends image capturing conditions (control signal) with respect to the body region to be imaged of the subject 50 to the radiation source device 18. When the radiation source controller 102 receives the image capturing conditions, the radiation source controller 102 controls the laser pointer 104 to stop emitting the laser beam 128, and controls the radiation source 44 to apply the radiation 46 with a predetermined dose to the subject 50 according to the image capturing conditions.

In the radiation source 44, the rotating mechanism 106 is controlled by the radiation source controller 102 to rotate the rotational shaft 108 and the rotary anode 110. The power supply 118 applies a negative voltage to the field-emission-type electron source 116 based on the electric power supplied from the battery 96, and the power supply 120 applies a voltage between the rotary anode 110 and the cathode 114 based on the electric power supplied from the battery 96. The field-emission-type electron source 116 emits electrons which are accelerated by the voltage applied between the rotary anode 110 and the cathode 114 and bombard the target layer 112. The surface of the target layer 112 which is bombarded with the electrons emits from the focused point 122 the radiation 46 whose intensity depends on the applied electrons.

When the subject 50 is irradiated with the radiation 46 for a given irradiation time based on the image capturing conditions in step S6, the radiation 46 passes through the subject 50 and reaches the radiation detector 86 of the cassette 12.

In step S7, since the radiation detector 86 is of the indirect conversion type, the scintillator of the radiation detector 86 emits visible light having an intensity depending on the intensity of the radiation 46, and the pixels 132 of the photoelectric conversion layer 138 converts the visible light into electric charges and store the electric charges. The electric charges stored by the pixels 132, which are representative of a radiographic image of the subject 50, are read from the pixels 132 according to address signals which are supplied from the address signal generator 162 of the cassette controller 92 to the line scanning driver 142 and the multiplexer 144.

Specifically, in response to the address signal supplied from the address signal generator 162, the address decoder 146 of the line scanning driver 142 outputs a selection signal to select one of the switches SW1, which supplies the control signal Von to the gates of the TFTs 140 connected to the gate line 134 corresponding to the selected switch SW1. In response to the address signal supplied from the address signal generator 162, the address decoder 152 of the multiplexer 144 outputs a selection signal to successively turn on the switches SW2 to switch between the signal lines 136 for thereby reading the electric charges stored in the pixels 132 connected to the gate line 134 selected by the line scanning driver 142, through the signal lines 136.

The electric charges read from the pixels 132 connected to the selected gate line 134 are amplified by the respective amplifiers 148, sampled by the sample and hold circuits 150, and supplied to the multiplexer 144. Based on the supplied electric charges, the multiplexer 144 generates and supplies a radiographic image signal to the A/D converter 154, which converts the radiographic image signal into a digital signal. The digital signal which represents the radiographic image information is temporally stored in the image memory 164 of the cassette controller 92 in step S8.

Similarly, the address decoder 146 of the line scanning driver 142 successively turns on the switches SW1 to switch between the gate lines 134 according to the address signal supplied from the address signal generator 162. The electric charges stored in the pixels 132 connected to the successively selected gate lines 134 are read through the signal lines 136, and processed by the multiplexer 144 and the A/D converter 154 into a digital signal, which are stored in the image memory 164 of the cassette controller 92 in step S8.

Figure 13:
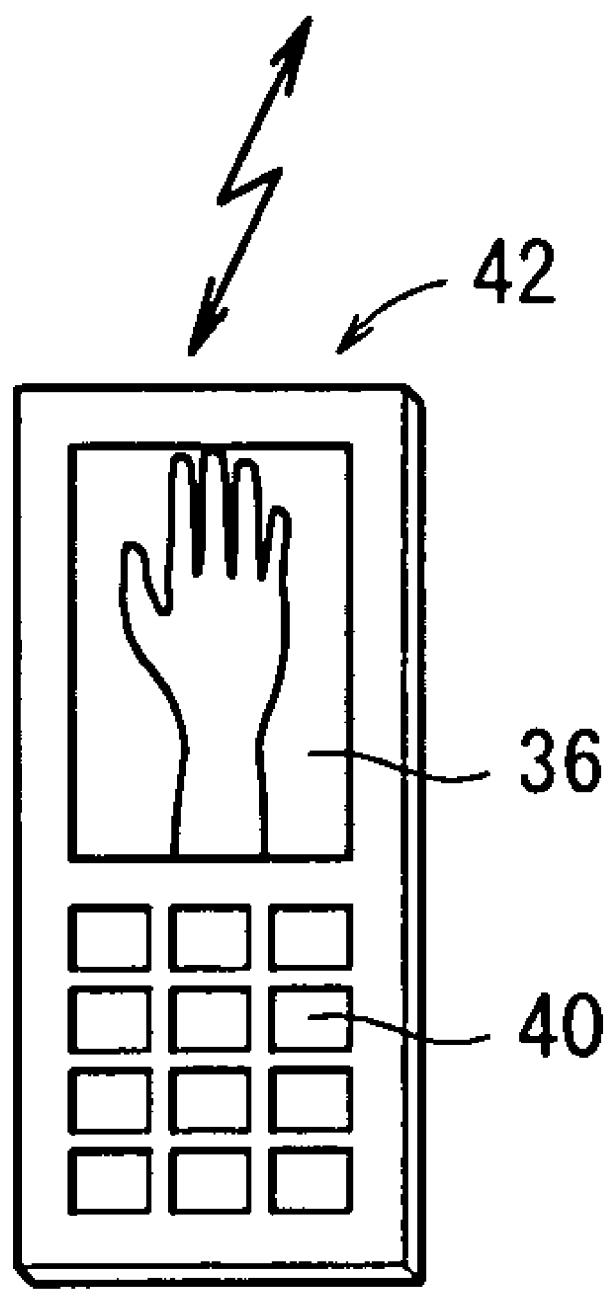
FIG. 13 is a perspective view of a mobile terminal which displays a radiographic image on a display unit thereof.

The radiographic image information represented by the digital signal stored in the image memory 164 is transmitted through the transceiver 94 to the mobile terminal 42 by way of wireless communications. The radiographic image information transmitted to the mobile terminal 42 is received by the transceiver 98 and transmitted from the transceiver 98 to the display unit 36, which displays a radiographic image based on the radiation image information in step S9, as shown in FIG. 13. The operator 38 can determine whether the body region to be imaged of the subject 50 has been appropriately imaged or not by confirming the radiographic image displayed on the display unit 36.

For example, if the radiographic image displayed on the display unit 36 does not include the body region to be imaged of the subject 50, then the operator 38 judges that the subject 50 has not been appropriately imaged, and performs the image capturing method on the subject 50 again.

The radiographic image displayed on the display unit 36 may be of a quality good enough to determine whether the subject 50 has been appropriately imaged or not. The displayed radiographic image may be either the radiographic image represented by the radiographic image information stored in the image memory 164, an image of low data, or an image processed to a relatively low resolution.

In step S10, the radiation source device 18 is moved to the side 14*a* of the cassette 12, whereupon the ribbon 76 starts to be coiled by the spring in the tape measure 72. With the holes 66, 62 being aligned with each other, the connection terminals 68*a*, 70*a* are brought into engagement with each other and the connection terminals 68*b*, 70*b* are brought into engagement with each other. The hook 64 engages the edge of the hole 66, integrally joining the radiation source device 18 to the cassette 12.

The unlock detector 160 now stops outputting its signal to the charging controller 170. The radiation source charging processor 158 also stops outputting its signal to the charging controller 170, and starts again to charge the battery 96 through the connection terminals 68*a*, 68*b*, 70*a*, 70*b*.

When the unlock detector 160 and the radiation source charging processor 158 stop outputting their signals to the charging controller 170, the charging controller 170 judges that the radiation source device 18 and the cassette 12 are integrally joined to each other, and controls the battery 90 to stop supplying electric power to the radiation detector 86. As a result, the radiographic image capturing apparatus 10A including the cassette 12 is brought into the sleep mode in step S11. With no signal supplied from the charging stop detector 105, the radiation source controller 102 nullifies the turn-on of the exposure switch 48, inhibiting the radiation source 44 from outputting the radiation 46 again.

The operator 38 carries back the radiographic image capturing apparatus 10A to the medical organization to which the operator 38 belongs. In the medical organization, the radiation image information stored in the image memory 164 is transmitted to various devices connected to an in-hospital network through the transceiver 94 by way of wireless communications or through the USB terminal 28 by way of wired communications. Alternatively, the radiation image information stored in the memory card 30, which is then removed from the card slot 32 and inserted into any of the various devices connected to the in-hospital network. Therefore, the radiation image information can be analyzed in detail for diagnosis in the medical organization.

With the radiographic image capturing apparatus 10A and the radiographic image capturing method carried thereby, as described above, the radiation source device 18 and the cassette 12 which are integrally joined to each other by the joining mechanism 82 are carried. To capture a radiographic image of the subject 50, the radiation source device 18 and the cassette 12 are separated from each other, and the radiation source 44 in the radiation source device 18 outputs and applies the radiation 46 to the subject 50. The radiographic image capturing apparatus 10A is thus portable, small, and light, and can be made ready simply and quickly to capture a radiographic image according to the preparatory procedure.

When the radiation source device 18 and the cassette 12 are separated from each other, the charging controller 170 of the cassette controller 92 controls the battery 90 to supply electric power to the radiation detector 86. Therefore, the radiation detector 86 can quickly be activated in the preparatory procedure.

When the radiation source device 18 and the cassette 12 are integrally joined to each other, the charging controller 170 of the cassette controller 92 controls the battery 90 to stop supplying electric power to the radiation detector 86. Therefore, the radiation detector 86 which has been activated can quickly be inactivated.

Since the radiation detector 86 is activated or inactivated depending on whether the radiation source device 18 and the cassette 12 are integrally joined to each other by the joining mechanism 82 or separated from each other, the radiographic image capturing apparatus 10A serves as a power saver.

It is easy to set the imaging distance to the SID by reeling out the ribbon 76 or the string 75 from the tape measure 72 by the reeled-out length 11. The rotary encoder 78 detects the reeled-out length of the ribbon 76 or the string 75, and the SID determining unit 168 determines whether the imaging distance agrees with the SID or not. The determined result is displayed on the display unit 36 to indicate to the operator 38 whether the actual reeled-out length of the ribbon 76 or the string 75 is equal to the reeled-out length 11 depending on the SID or not. Therefore, the operator 38 finds it easy to set the SID.

The graduations 74 on the ribbon 76 or the string 75 allow the operator 38 to reel out the ribbon 76 or the string 75 by the reeled-out length 11 while watching the graduations 74. Consequently, the subject 50 can be irradiated with the radiation 46 at an appropriate dose when a radiographic image of the subject 50 is to be captured. The graduations 74 also make it possible to measure the dimensions of the body region to be imaged of the subject 50 during the preparatory procedure. Rather than reeling out the ribbon 76 or the string 75 by the reeled-out length 11, the ribbon 76 or the string 75 may be reeled out from the tape measure 72 by a given length, and the cassette controller 92 may reset the value of SID depending on the given length as an image capturing condition.

According to the conventional process of capturing radiographic images, the tube voltage of the radiation source 44 has been regarded as an important irradiating condition representing the quality of the radiation 46, and the value of mA·s (the product of the current and the irradiation time, i.e., the total exposure level of the radiation 46) has been regarded as an important irradiating condition representing the quantity of the radiation 46.

However, for better radiation dose management, the imaging distance (SID) between the focused point 122 of the radiation source 44 and the position 124 on the radiation detector 86 is also regarded as an important irradiating condition. Specifically, since the dose of the radiation 46 drops in inverse proportion to the square of the imaging distance, even if the radiation 46 having an exposure level depending on the tube voltage of the radiation source 44 and the value of mA·s is output from the radiation source 44, the dose of the radiation 46 that is actually applied to the subject 50 is different depending on the value of SID.

According to the first embodiment, in addition to setting the reeled-out length of the ribbon 76 or the string 75 to the reeled-out length 11, the image capturing conditions including the reeled-out length 11 and the SID as well as the radiographic image information may be stored in the image memory 164, or may be displayed together with the radiation image on the display unit 36. These stored or displayed image capturing conditions make it possible for the operator 38 to recognize the tube voltage, the value of mA·s, and the SID with which the radiographic image has been captured. It is thus easy to perform better radiation dose management for radiographic images that are captured at disaster sites and homes receiving home-care services.

Since the cassette 12 includes the transceiver 94, and the radiation source device 18 includes the transceiver 100, the cassette controller 92 and the radiation source controller 102 can send signals to and receive signals from each other via the transceivers 94, 100. Therefore, the outputting of the radiation 46 from the radiation source 44 in response to the exposure switch 48 being turned on and the conversion by the radiation detector 86 from the radiation 46 into the radiation image information can be synchronized with each other. The battery 96 may be supplied with electric power in timed relation to the above synchronization.

The radiation source device 18 and the cassette 12 are integrally joined to each other easily by the hook 64 which engages the edge of the hole 66.

As the ends of the radiation source device 18 are held by the respective holders 16a, 16b, the radiation source device 18 and the cassette 12 remain integrally joined to each other.

The ends of the radiation source device 18 have the connection terminals 68a, 68b, respectively, and the holders 16a, 16b have the connection terminals 70a, 70b, respectively, in confronting relation to the connection terminals 68a, 68b. When the ends of the radiation source device 18 are held by the respective holders 16a, 16b, the connection terminals 68a, 68b and the connection terminals 70a, 70b engage each other, respectively. Consequently, the radiation source device 18 and the cassette 12 easily remain integrally joined to each other.

Either one of the connection terminals 68a, 68b and either one of the connection terminals 70a, 70b are convex and the other terminals are concave. Accordingly, the connection terminals 68a, 68b and the connection terminals 70a, 70b are held in reliable engagement with each other. When the operator 38 orients the radiation source device 18 the other way around in error, the radiation source device 18 cannot be joined to the cassette 12 because the convex connection terminals do not snugly engage with each other and the concave connection terminals do not snugly engage with each other.

The connection terminals 70a, 70b are electrically connected to the battery 90 in the cassette 12, and the connection terminals 68a, 68b are electrically connected to the battery 96 in the radiation source device 18. When the connection terminals 68a, 70a engage with each other and the connection terminals 68b, 70b engage with each other, the battery 96 can be charged by the battery 90 through the connection terminals 68a, 68b, 70a, 70b.

If the battery 96 is charged to a level high enough to capture a desired number of radiographic images of the subject 50, then the desired number of radiographic images of the subject 50 can reliably be captured.

When the radiation source device 18 and the cassette 12 are integrally joined to each other by the joining mechanism 82, the radiation source 44 is disposed in the radiation source device 18 in confronting relation to the cassette 12. Therefore, the radiation source 44 is prevented from emitting the radiation 46 in wrong directions as long as the radiation source device 18 and the cassette 12 are integrally joined to each other. In addition, when the radiation source device 18 and the cassette 12 are integrally joined to each other, even if the operator 38 turns on the exposure switch 48, the radiation source controller 102 or the cassette controller 92 nullifies the turn-on operation on the exposure switch 48 and hence does not energize the radiation source 44. As the radiation source 44 is thus inhibited from emitting the radiation 46, the radiation source 44 is reliably prevented from emitting the radiation 46 in error.

The first embodiment is not limited to the details described above, but may be modified as follows:

In the above description of the first embodiment, the radiation detector 86 is activated when the radiation source device 18 and the cassette 12 are separated from each other. However, the radiation source 44 may also be activated when the radiation source device 18 and the cassette 12 are separated from each other. The radiation source 44 may also be inactivated when the radiation source device 18 and the cassette 12 are integrally joined to each other.

The radiographic image capturing apparatus 10A may be activated in its entirety when the radiation source device 18 and the cassette 12 are separated from each other. The radiographic image capturing apparatus 10A may be shut down in its entirety or placed in the sleep mode when the radiation source device 18 and the cassette 12 are integrally joined to each other.

In the above description of the first embodiment, the image capturing process is started when the exposure switch 48 is turned on. However, the image capturing process may be started when the operator 38 operates the control pad 40 of the mobile terminal 42. In other words, one of the control buttons of the control pad 40 may be used as a dedicated exposure switch.

The cassette 12 is illustrated as having a rectangular housing shape. However, the cassette 12 may be in the form of a flexible sheet in a portion thereof which includes the radiation detector 86. The cassette 12 in the form of a flexible sheet makes it possible to reduce the entire radiographic image capturing apparatus 10A in size and weight because the flexible sheet can be coiled into a roll.

During the image capturing process, the radiation source device 18 is securely fixed in position by a holder, not shown. However, the operator 38 may hold the radiation source device 18 by hand at least during the image capturing process.

In the above description of the first embodiment, the battery 90 charges the battery 96. However, the battery 96 may be regarded as a power supply for the entire radiographic image capturing apparatus 10A, and may charge the battery 90.

In the above description of the first embodiment, during the image capturing process, the cassette controller 92 sends image capturing conditions (control signal) to the radiation source controller 102 thereby to synchronize the outputting of the radiation 46 from the radiation source 44 and the conversion by the radiation detector 86 from the radiation 46 into the radiation image information. Instead, the radiation source controller 102 may have a function to register image capturing conditions in advance, and may send the image capturing conditions to the cassette controller 92 in response to the exposure switch 48 being turned on or in response to the separation of the radiation source device 18 from the cassette 12.

In the first embodiment, signals are sent and received between the cassette 12 and the radiation source device 18 by way of wireless communications. Therefore, no cables are required to send and receive signals between the cassette 12 and the radiation source device 18, and hence no obstacles are present to the operator 38 working on the radiographic image capturing apparatus 10A. The operator 38 is thus able to work efficiently on the radiographic image capturing apparatus 10A.

The first embodiment is applicable to the acquisition of radiographic images using a light readout type radiation detector. The light readout type radiation detector operates as follows: When a radiation is applied to a matrix of solid-state detecting devices, the solid-state detecting devices store an electrostatic latent image depending on the dose of the applied radiation. For reading the stored electrostatic latent image, reading light is applied to the solid-state detecting devices to cause the solid-state detecting devices to generate an electric current representing radiation image information. When erasing light is applied to the radiation detector, radiographic image information representing a residual electrostatic latent image is erased from the radiation detector, which can thus be reused (see Japanese Laid-Open Patent Publication No. 2000-105297).

To prevent the radiographic image capturing apparatus 10A from being contaminated with blood and bacteria, the entire radiographic image capturing apparatus 10A may be of a water-resistant and hermetically sealed structure, and may be sterilized and cleaned when necessary so that it can be used repeatedly.

The radiographic image capturing apparatus 10A may communicate with external devices by way of wireless communications using radio-wave signals or light signals such as infrared signals or the like.

Figure 14:
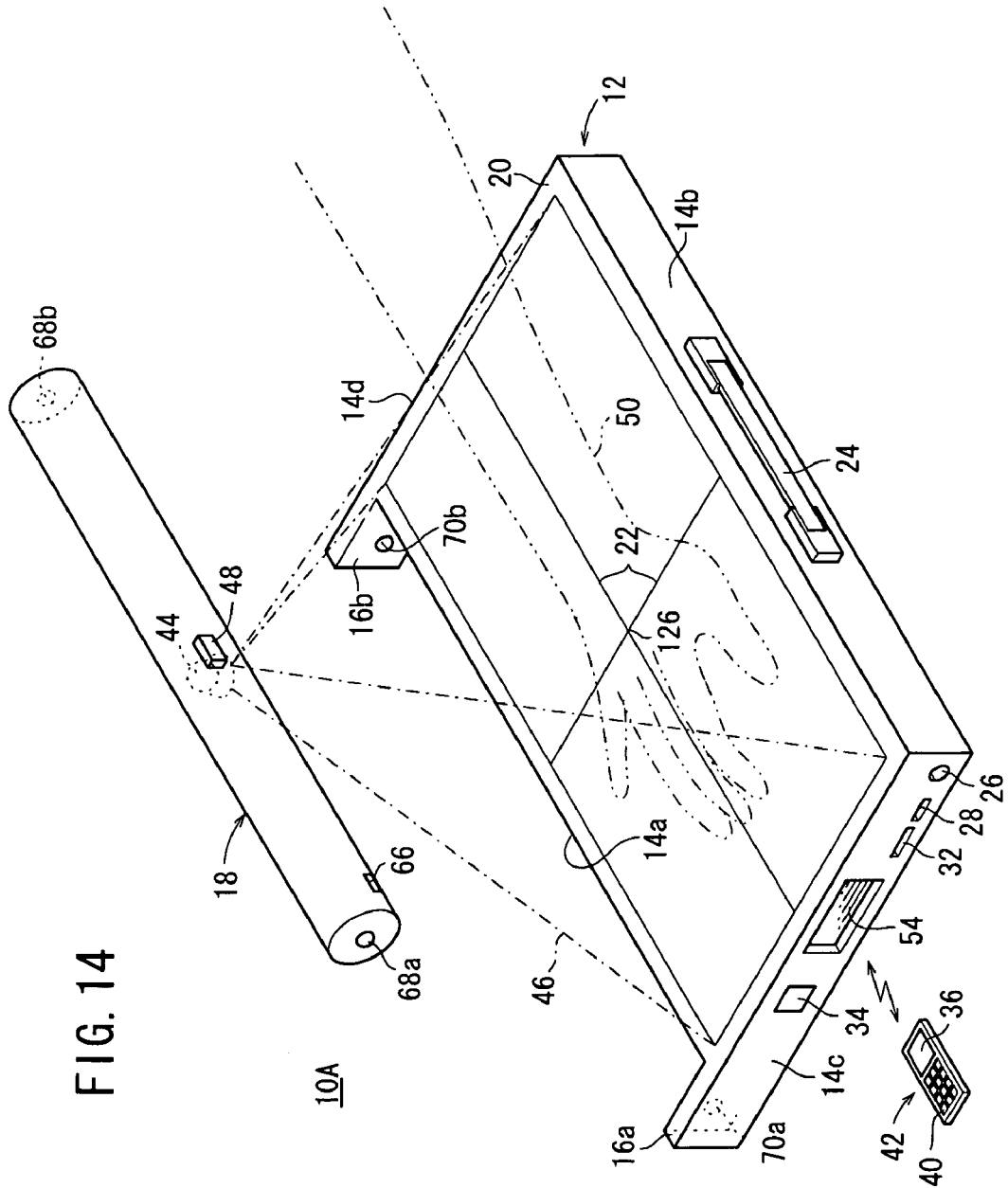
FIG. 14 is a perspective view of a modification of the radiographic image capturing apparatus shown in FIG. 1.

In the first embodiment, the radiographic image capturing apparatus 10A may be dispensed with the tape measure 72, as shown in FIG. 14. The radiographic image capturing apparatus 10A which is free of the tape measure 72 provides advantages associated with the components thereof other than the tape measure 72.

In the above description of the first embodiment, the joining mechanism 82 has major components disposed in the cassette 12. However, the major components of the joining mechanism 82 may be disposed in the radiation source device 18.

Figure 15:
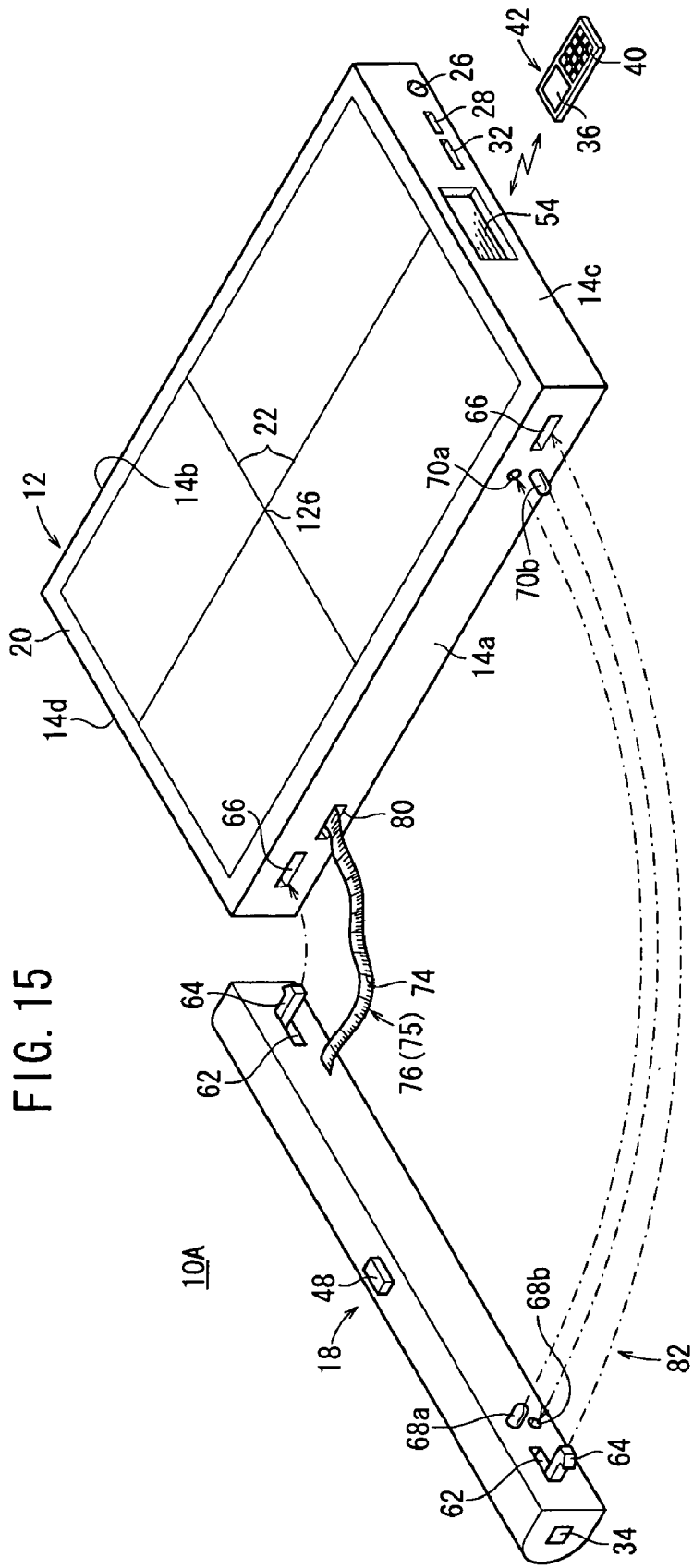
FIG. 15 is a perspective view of another modification of the radiographic image capturing apparatus shown in FIG. 1.

FIG. 15 shows a radiographic image capturing apparatus 10A according to a modification in which the unlock button 34, the hook 64, etc. are provided in the radiation source device 18.

As shown in FIG. 15, the side 14a of the cassette 12 does not have the holders 16a, 16b, and the radiation source device 18 has a flat side facing the side 14a of the cassette 12. The opposite ends of the radiation source device 18 have respective unlock buttons 34. The radiation source device 18 also has holes 62 and hooks 64 in the flat side thereof which faces the side 14a of the cassette 12, near the opposite ends of the radiation source device 18. Connection terminals 68a, 68b are disposed on the flat side of the radiation source device 18 near one of the ends of the radiation source device 18.

The side 14a of the cassette 12 has holes 66 defined therein in alignment with the respective holes 62 and connection terminals 70a, 70b in alignment with the connection terminals 68a, 68b.

The radiographic image capturing apparatus 10A shown in FIG. 15 operates as follows: While the flat side of the radiation source device 18 and the side 14a of the cassette 12 are facing each other, the hooks 64 are inserted into the respective holes 66, and the connection terminals 68*a*, 68*b* and the connection terminals 70*a*, 70*b* are brought into engagement with each other. The radiation source device 18 and the cassette 12 are now integrally joined to each other.

The radiographic image capturing apparatus 10A shown in FIG. 15 offers the same advantages as the radiographic image capturing apparatus 10A according to the first embodiment.

According to the modification shown in FIG. 15, since the unlock buttons 34 are disposed on the opposite ends of the radiation source device 18, the operator 38 can easily disconnect the radiation source device 18 from the cassette 12 simply by detaching the radiation source device 18 from the cassette 12 while pressing the unlock buttons 34.

Figure 16:
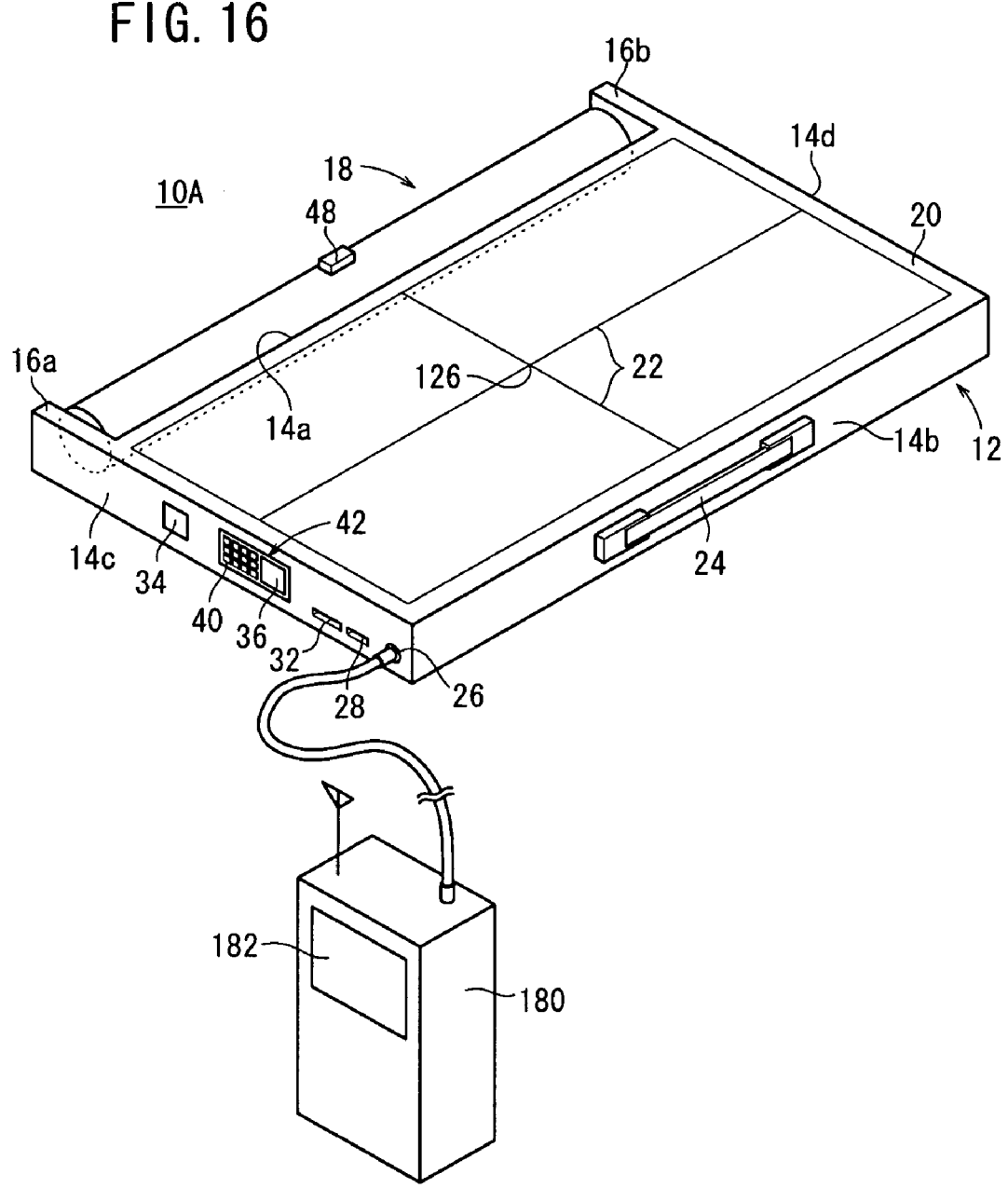
FIG. 16 is a perspective view of still another modification of the radiographic image capturing apparatus shown in FIG. 1.

In the first embodiment, as shown in FIG. 16, a cradle 180 for charging the battery 90 of the radiographic image capturing apparatus 10A is positioned at a desired location in the hospital. The cradle 180 may not only be able to charge the battery 90, but also have a wireless or wired communication function to send and receive necessary information to and from an external device in the hospital. The information that is sent from the cradle 180 may include radiation image information recorded in the radiographic image capturing apparatus 10A that is connected to the cradle 180.

The cradle 180 has a display unit 182 for displaying the charged state of the radiographic image capturing apparatus 10A loaded on the cradle 180 and necessary information including radiation image information acquired from the radiographic image capturing apparatus 10A.

A plurality of cradles 180 may be connected to a network, and charged states of radiographic image capturing apparatus 10A that are loaded on the cradles 180 may be retrieved through the network, so that the user can confirm the locations of any radiographic image capturing apparatus 10A which are sufficiently charged, based on the retrieved charged stages.

The radiographic image capturing apparatus 10A according to the first embodiment has been illustrated as being used to capture radiographic images at disaster sites and homes receiving home-care services. However, the radiographic image capturing apparatus 10A according to the first embodiment is not limited to use in the capture of radiographic images in the medical field, but is also applicable to the capture of radiographic images in various nondestructive tests.

A radiographic image capturing apparatus 10B according to a second embodiment will be described below with reference to FIGS. 17 through 23.

Those parts of the radiographic image capturing apparatus 10B which are identical to those of the radiographic image capturing apparatus 10A according to the first embodiment (see FIGS. 1 through 16) are denoted by identical reference characters, and will not be described in detail below.

The radiographic image capturing apparatus 10B according to the second embodiment is different from the radiographic image capturing apparatus 10A according to the first embodiment in that the radiation source device 18 and the cassette 12 are joined to each other by arms (joining members) 190.

As shown in FIG. 17, arms 190 have respective cylindrical proximal ends (shafts) 192 mounted on substantially central portions of the sides 14*c*, 14*d* of the cassette 12 and also have respective distal ends 194 fixed to the respective opposite ends of the radiation source device 18. The radiation source device 18 can be brought into facing relation to the irradiated surface 20 when the arms 190 are turned about the proximal ends 192 thereof (see FIGS. 20 and 21). The arms 190 have a fixed length depending on the SID, so that when the arms 190 are turned to move the radiation source device 18 to a position above the irradiated surface 20, the imaging distance can easily be set to the SID.

Figure 18A:
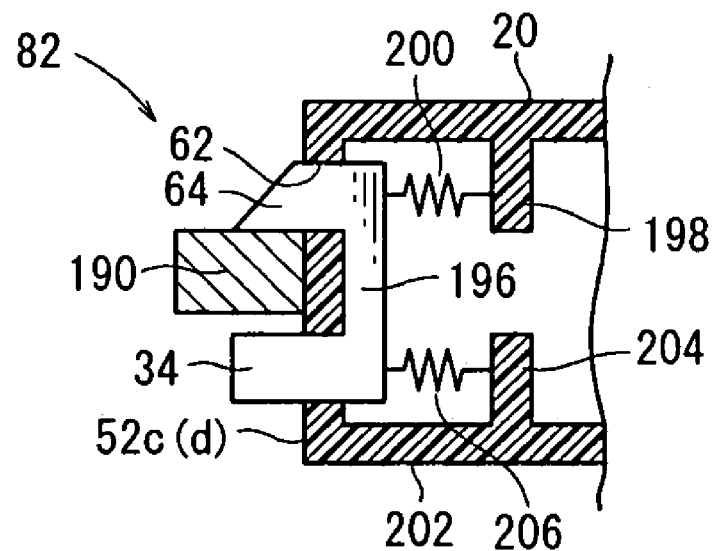
FIGS. 18A and 18B are enlarged fragmentary cross-sectional views taken along line XVIII-XVIII of FIG. 17.
Figure 18B:
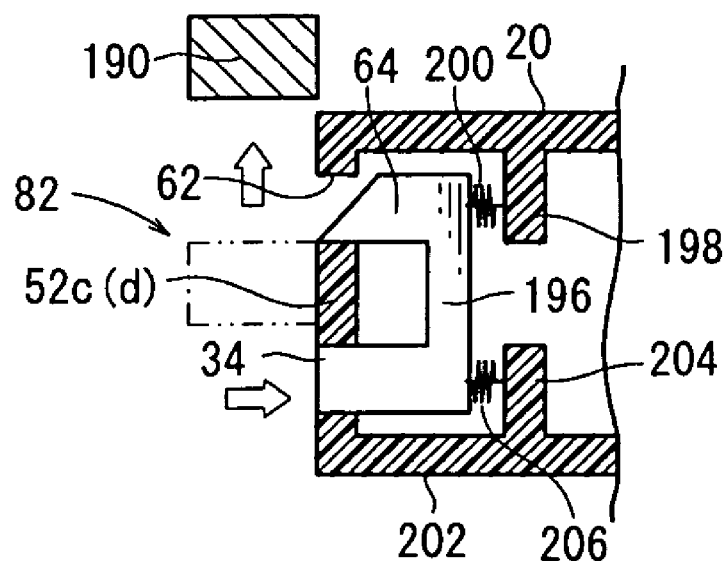

As shown in FIGS. 18A and 18B, the hook 64 is joined to the unlock button 34 by a joining 196. The hook 64 is connected to the upper end of the joining 196 and the unlock button 34 is connected to the lower end of the joining 196. A ledge 198 projects downwardly from the irradiated surface 20 of the cassette 12, and a spring 200 is connected between the ledge 198 and the upper end (the hook 64) of the joining 196 for normally biasing the hook 64 to move away from the ledge 198. A ledge 204 projects upwardly from a bottom surface 202, which is spaced downwardly from the irradiated surface 20, of the cassette 12, and a spring 206 is connected between the ledge 204 and the lower end (unlock button 34) of the joining 196 for normally biasing the unlock button 34 to move away from the ledge 204.

As shown in FIGS. 17 and 18A, the unlock button 34 is normally exposed partially out of the cassette 12 and also the hook 64 is normally exposed partially out of the cassette 12 through the hole 62 under the resiliency of the springs 200, 206. When the operator 38 presses the unlock button 34 against the resiliency of the springs 200, 206, the exposed tip end of the hook 64 is retracted into the hole 62, as shown in FIG. 18B.

Figure 19A:
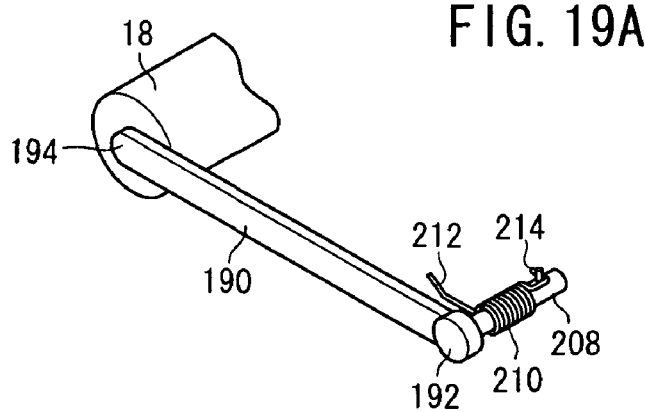
FIGS. 19A through 19C are perspective and cross-sectional views illustrative of the function of a torsion spring on the proximal end of an arm shown in FIG. 17.
Figure 19B:
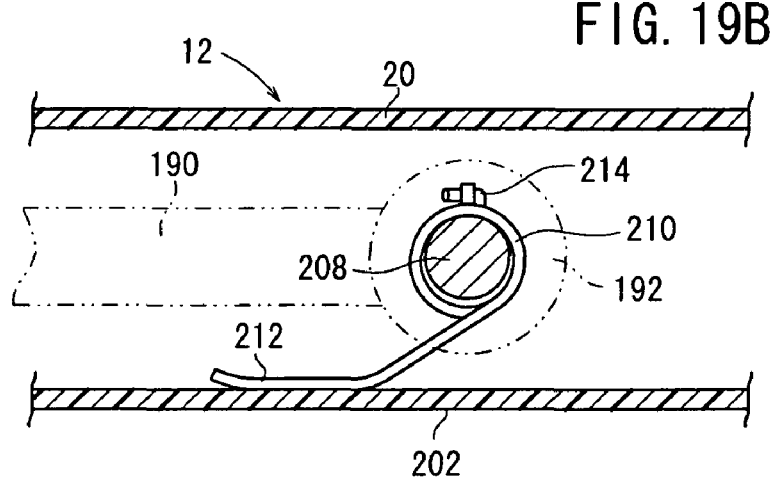
Figure 19C:
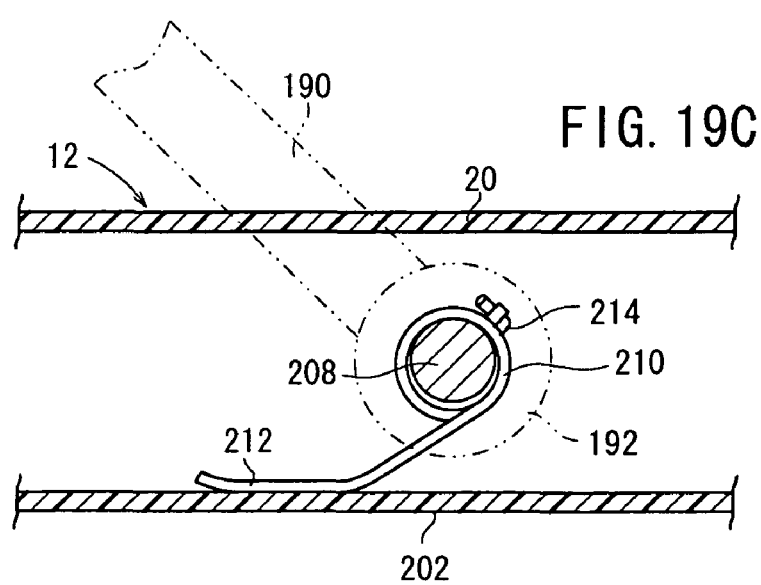

As shown in FIGS. 19A through 19C, the cylindrical proximal end 192 of each of the arms 190 has a shaft 208 extending into the cassette 12, and a torsion spring (arm turning means) 210 is mounted on the shaft 208. The torsion spring 210 has an end 212 held in contact with the bottom surface 202 and an opposite end 214 fixed to the shaft 208. The torsion spring 210 normally biases the proximal end 192 and the shaft 208 to turn clockwise in FIGS. 19B and 19C.

Operation of the radiographic image capturing apparatus 10B according to the second embodiment from the state in which the radiation source device 18 and the cassette 12 are integrally joined to each other as shown in FIGS. 17 and 18A to an image capturing position and state shown in FIGS. 20 and 21 will be described below.

While the radiation source device 18 and the cassette 12 are integrally joined to each other as shown in FIGS. 17 and 18A, the operator 38 presses the unlock button 34. The joining 196 is displaced toward the ledges 198, 204 against the resiliency of the springs 200, 206, temporally retracting the hook 64 which prevents the arm 190 from angular movement into the hole 62 (see FIG. 18B).

Since the hook 64 is displaced out of engagement with the arm 190, the proximal end 192 and the shaft 208 are turned clockwise in FIGS. 19B and 19C under the resiliency of the torsion spring 210. The arm 190 is thus turned about the proximal end 192 and the shaft 208 in unison therewith. As a result, the radiation source device 18 is separated from the cassette 12 and moved to a position above the irradiated surface 20, i.e., above the central position 126, so that the imaging distance is automatically set to the SID. The process of setting the imaging distance is now completed.

After the arm 190 is turned, the operator 38 releases the unlock button 34. Since the joining 196 returns to the position shown in FIG. 18A under the resiliency of the springs 200, 206, the hook 64 is exposed again out of the hole 62.

After the radiographic image capturing apparatus 10B has captured a radiographic image, the operator 38 returns the distal end 194 of the arm 190 to the side surface 14*a* against the resiliency of the torsion spring 210. Since the arm 190 as it turns downwardly presses the hook 64 into the hole 62, the joining 196 is displaced toward the ledges 198, 204 against the resiliency of the springs 200, 206, temporally retracting the hook 64 into the hole 62. Thereafter, the when the arm 190 descends to the position shown in FIGS. 17 and 18A, the joining 196 returns to the position shown in FIG. 18A under the resiliency of the springs 200, 206. The hook 64 is exposed again out of the hole 62 and engages the arm 190, preventing the arm 190 from being turned.

With the radiographic image capturing apparatus 10B according to the second embodiment and the radiographic image capturing method carried thereby, as described above, when the hook 64 and the arm 190 are disengaged from each other, the arm 190 is turned about the proximal end 192 and the shaft 208. The radiation source device 18 and the cassette 12 are automatically separated and hence released from the integrally joined state.

As the arms 190 have a fixed length depending on the SID, the imaging distance is automatically set to the SID simply when the arms 190 are turned to move the radiation source device 18 to the position above the irradiated surface 20. Therefore, the process of setting the imaging distance is very easy to carry out.

Figure 20:
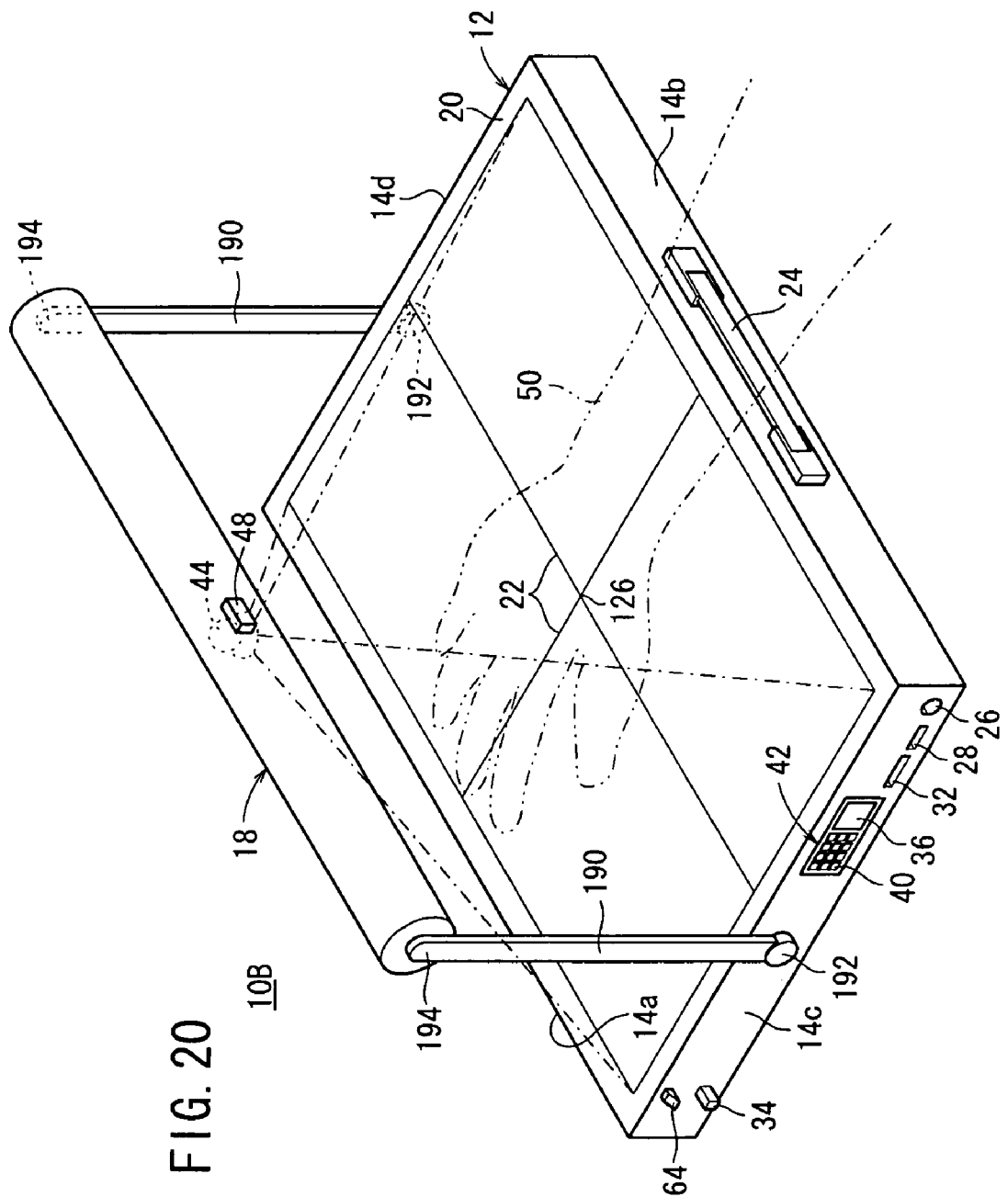
FIG. 20 is a perspective view showing the manner in which the radiographic image capturing apparatus shown in FIG. 17 captures a radiographic image.
Figure 21:
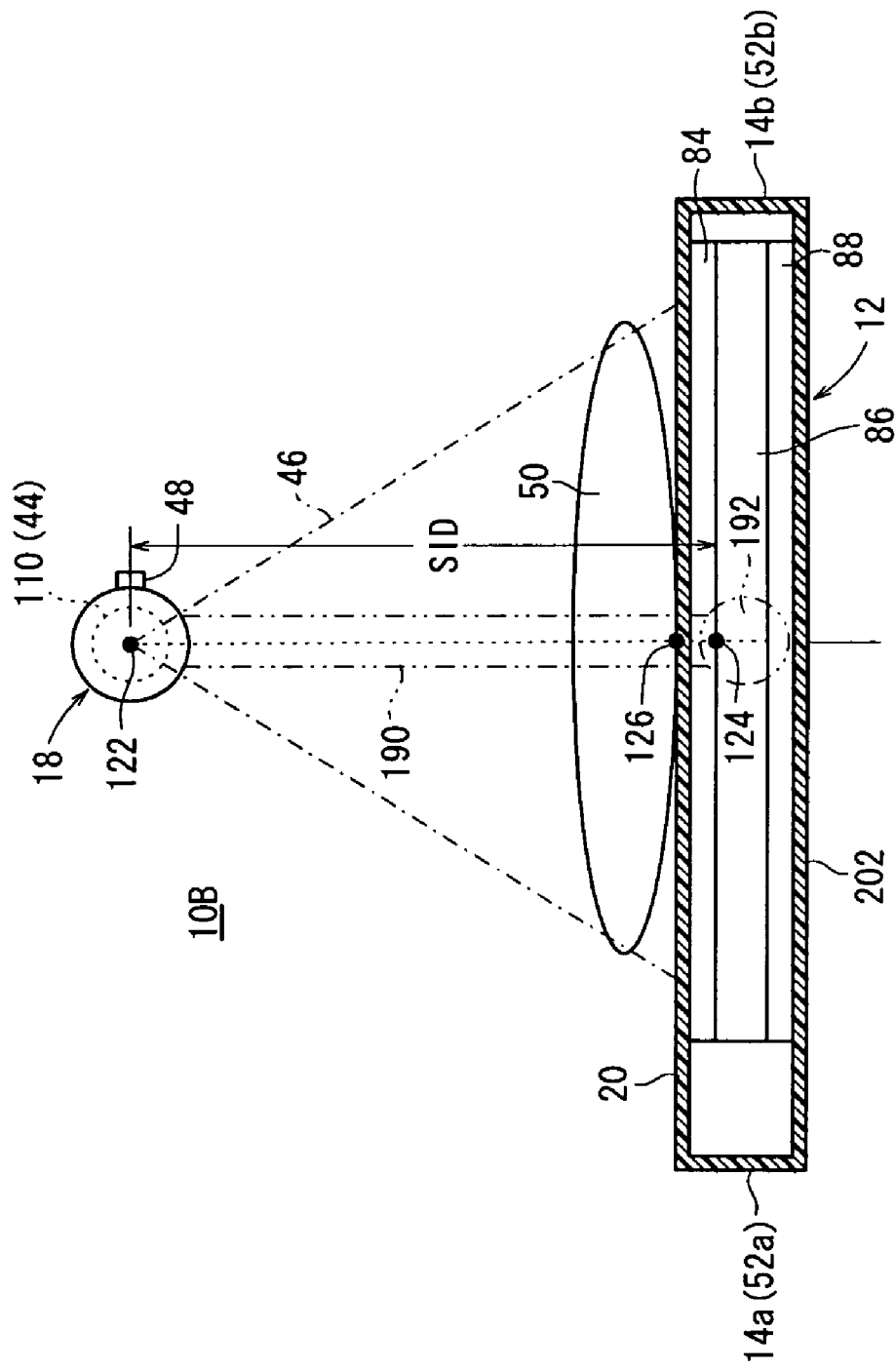
FIG. 21 is an elevational view, partly in cross section, showing the manner in which the radiographic image capturing apparatus shown in FIG. 17 captures a radiographic image.

The imaging distance is easily and accurately set because the torsion spring 210 for turning the arm 190 from the position shown in FIG. 17 to the position shown in FIGS. 20 and 21 is mounted on the shaft 208 extending from the proximal end 192.

Figure 22:
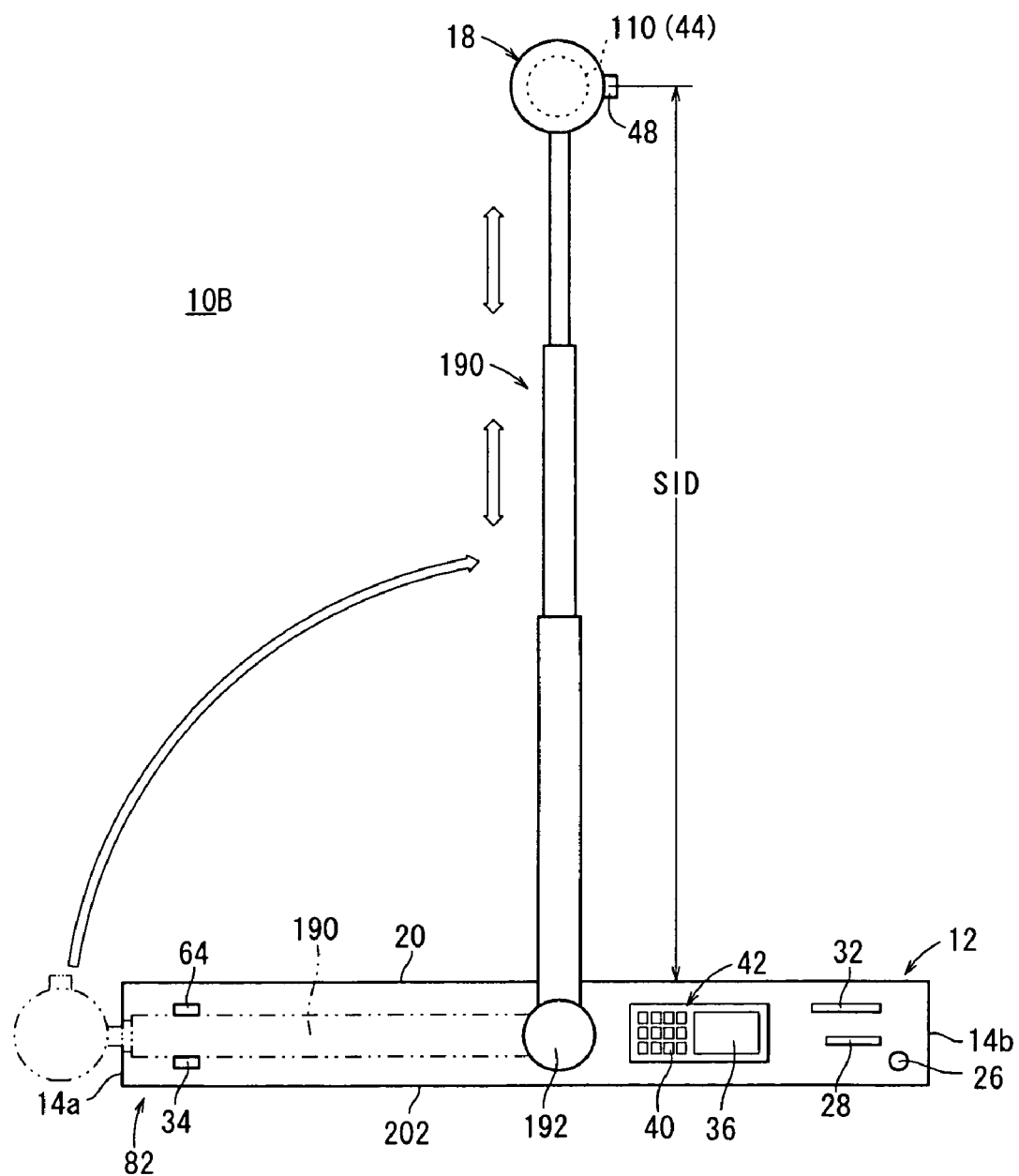
FIG. 22 is a side elevational view a modification of the radiographic image capturing apparatus shown in FIG. 17.

In FIGS. 17 through 21, the arms 190 are illustrated as having a fixed length. However, as shown in FIG. 22, a modified radiographic image capturing apparatus 10B may have a telescopic arm 190 to provide an adjustable SID.

Figure 23:
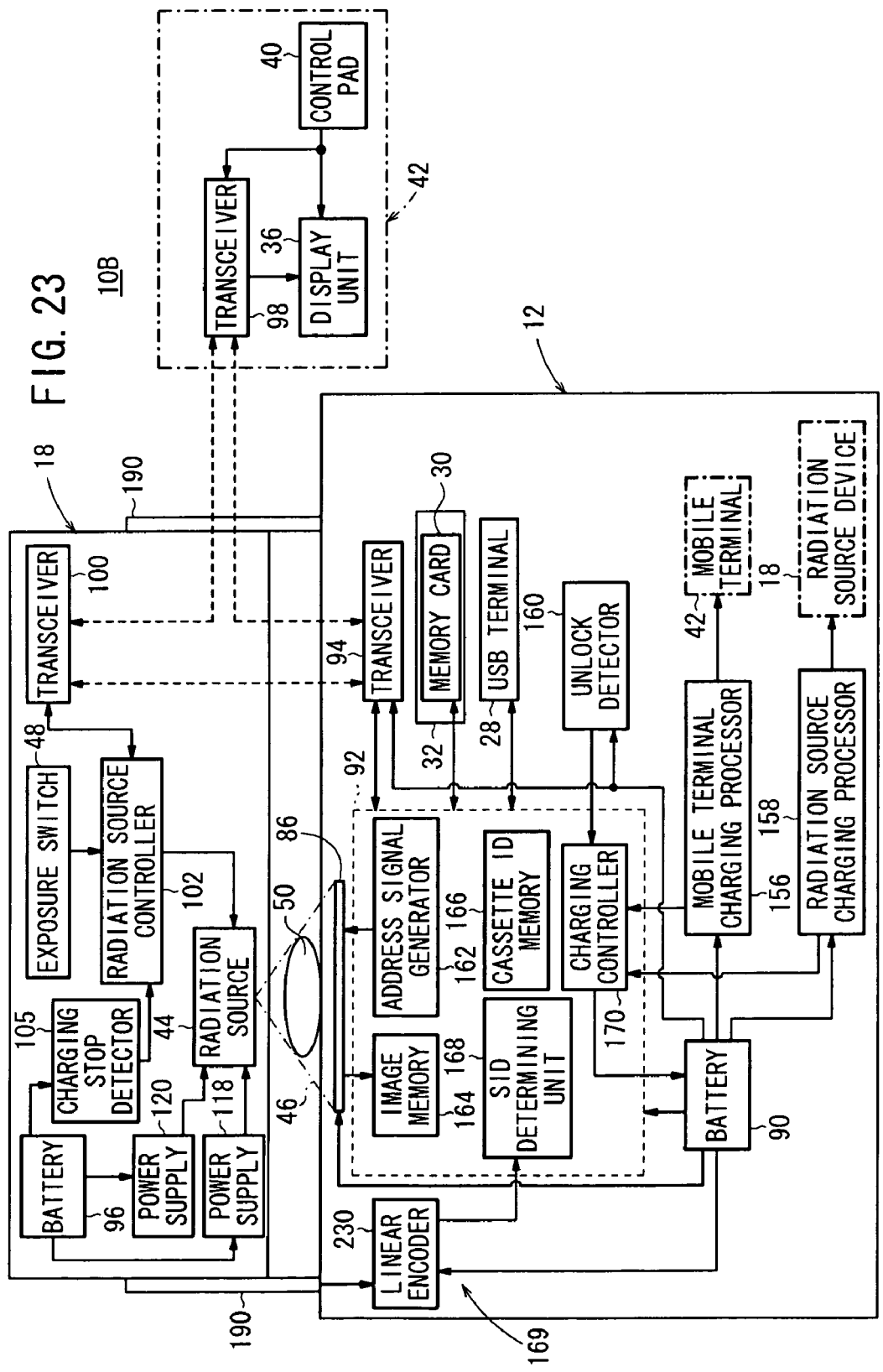
FIG. 23 is a block diagram of the radiographic image capturing apparatus according to the second embodiment.

According to the modified radiographic image capturing apparatus 10B, as shown in FIG. 23, the cassette 12 houses therein a linear encoder (arm length detector) 230 for detecting the length of the arm 190. The SID determining unit 168 calculates an SID based on the detected length of the arm 190, and the display unit 36 displays the SID received through the transceivers 94, 98. The operator 38 thus can easily recognize what value of SID the present length of the arm 190 corresponds to by seeing the SID displayed on the display unit 36.

In the second embodiment, the laser pointer 104 (see FIG. 1) is dispensed with because the radiation source device 18 is positioned above the central position 126 when the arms 190 are turned. In FIG. 23, the arms 190, the linear encoder 230, and the SID determining unit 168 jointly make up an imaging distance setting means 169.

In the second embodiment, the battery 96 may be charged through the connection terminals 68a, 68b, 70a, 70b when the arms 190 are secured to the position shown in FIG. 17, for example, as with the first embodiment. The connection terminals 68a, 68b are provided on the arms 190 or the radiation source device 18, whereas the connection terminals 70a, 70b are provided in given positions on the side surfaces 14c, 14d which face the arms 190 or in given positions on the side surface 14a which faces the radiation source device 18. According to the second embodiment, therefore, the radiation detector 86 is activated when the radiation source device 18 and the cassette 12 are separated from each other, as with the first embodiment.

Figure 24:
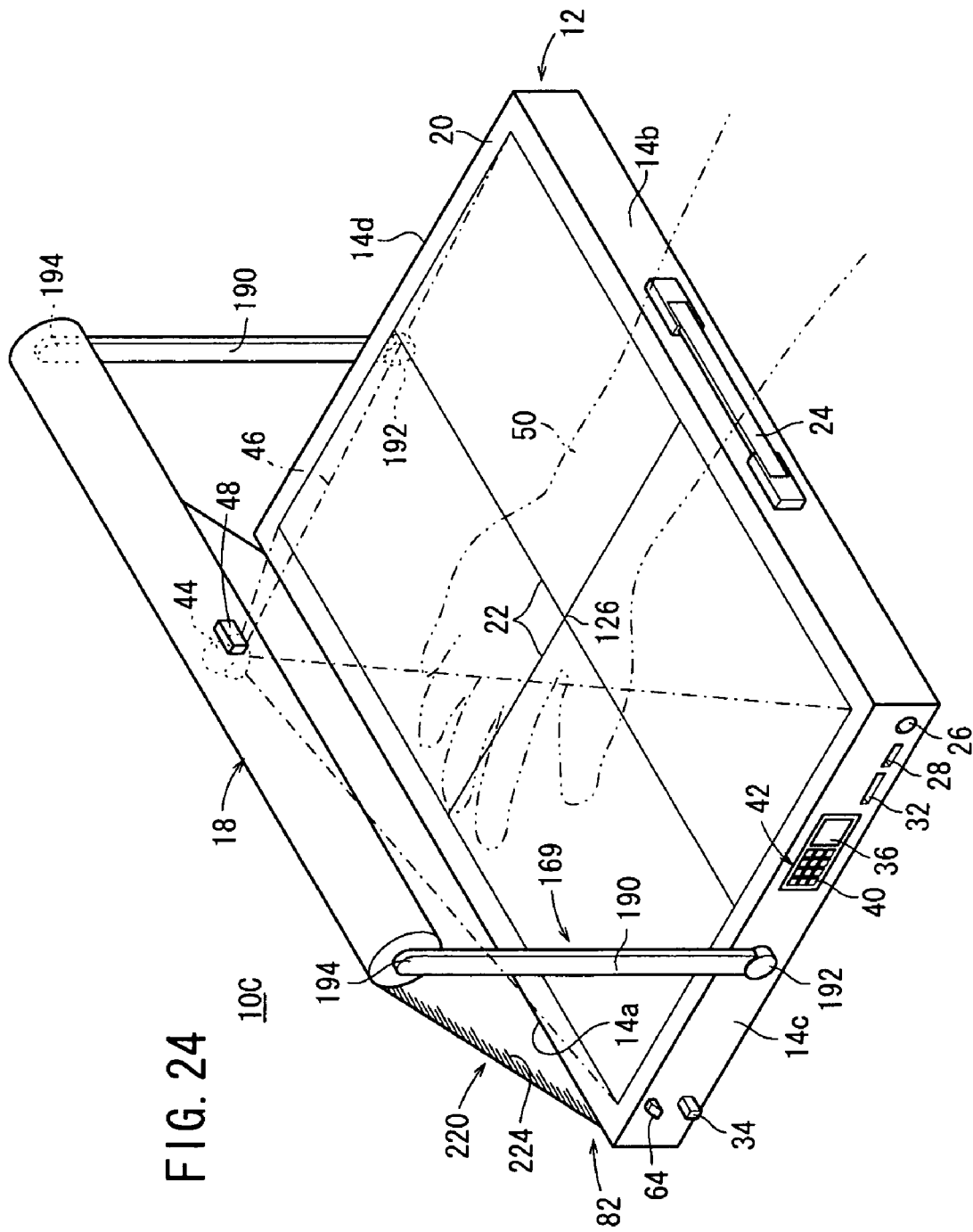
FIG. 24 is a perspective view of a radiographic image capturing apparatus according to a third embodiment of the present invention.
Figure 25:
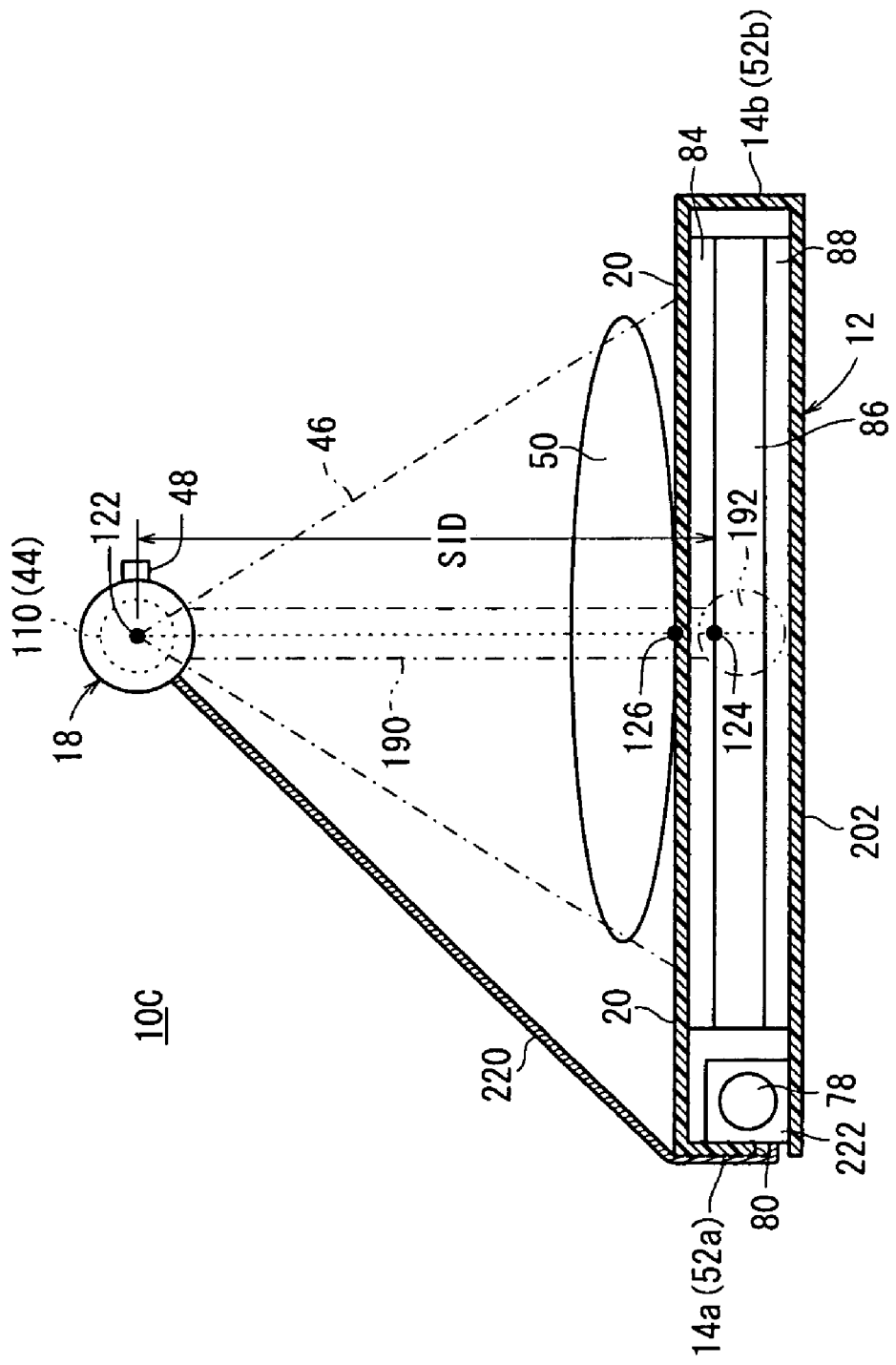
FIG. 25 is a cross-sectional view of the radiographic image capturing apparatus shown in FIG. 24.
Figure 26:
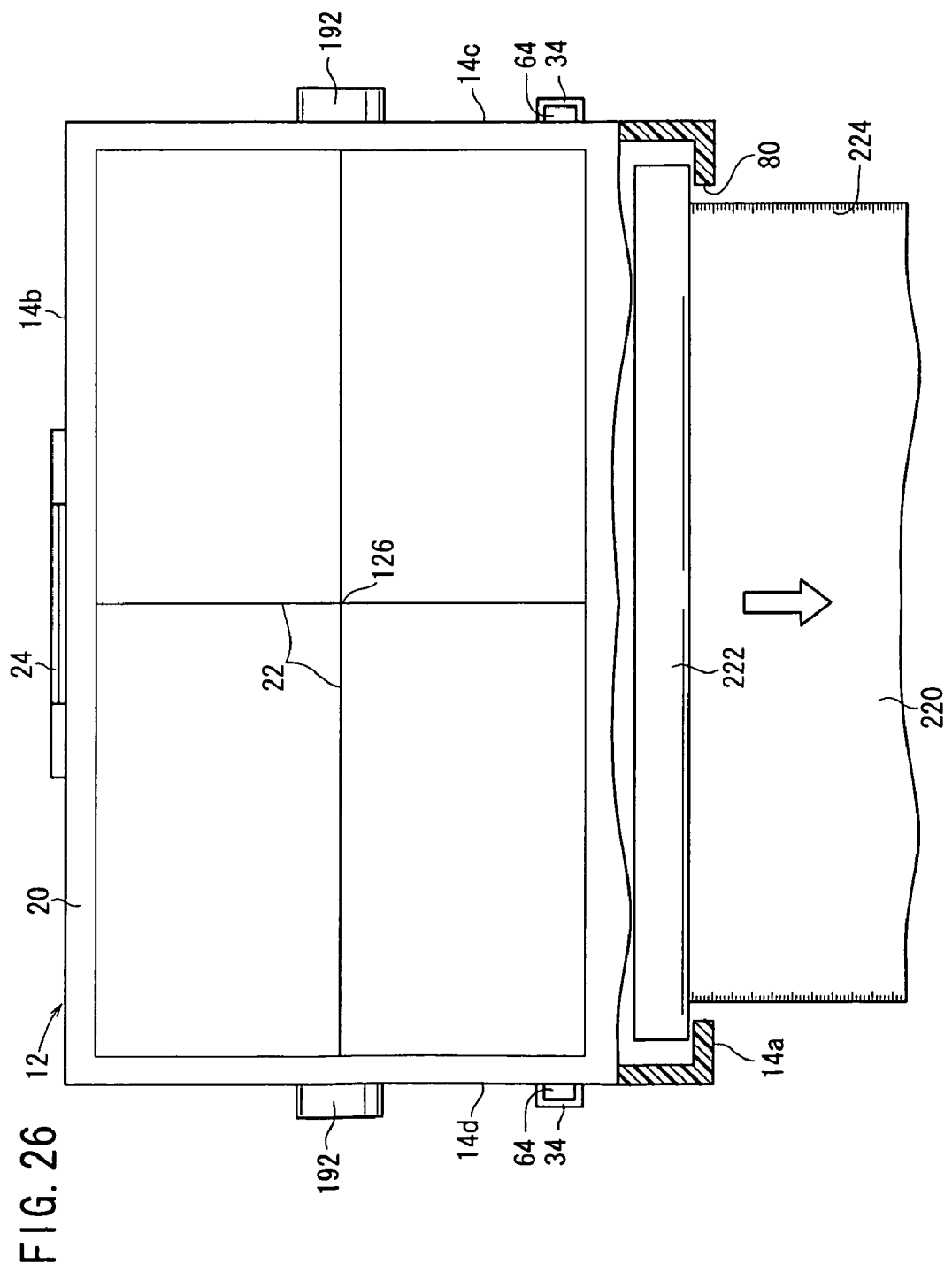
FIG. 26 is a plan view of the radiographic image capturing apparatus shown in FIG. 24.

A radiographic image capturing apparatus 10C according to a third embodiment will be described below with reference to FIGS. 24 through 26.

Those parts of the radiographic image capturing apparatus 10C which are identical to those of the radiographic image capturing apparatus 10A, 10B according to the first and second embodiments (see FIGS. 1 through 23) are denoted by identical reference characters, and will not be described in detail below.

The radiographic image capturing apparatus 10C according to the third embodiment is different from the radiographic image capturing apparatus 10B according to the second embodiment (see FIGS. 17 through 23) in that in order to prevent the radiation 46 or scattered rays of the radiation 46 from being radiated around, a roll-screen housing box (screen housing) 222 for rolling and housing a screen (joining member) 220 which is made of lead for absorbing the radiation 46 or scattered rays of the radiation 46 is accommodated in the cassette 12 near the side wall 52a thereof, and the screen 220 has a distal end fixed to the radiation source device 18.

The screen 220 protects persons other than the subject 50, e.g., the operator 38, against unwanted exposure to the radiation or scattered rays of the radiation 46 while the subject 50 is being imaged. The screen 220 is automatically pulled out of the housing box 222 when the radiation source device 18 is moved to the position above the irradiated surface 20 upon turning movement of the arms 190. Consequently, the operator 38 finds it easy to perform the preparatory procedure. The screen 220 is marked with graduations 224 which may be used to measure the dimensions of the body region to be imaged of the subject 50, for example.

The rotary encoder 78 is combined with the housing box 222 for detecting a reeled-out length of the screen 220 pulled from the housing box 222. The SID determining unit 168 calculates an imaging distance based on the detected reeled-out length of the screen 220 and determines whether the calculated imaging distance agrees with the SID or not. Therefore, the imaging distance can easily be set to the SID by the radiographic image capturing apparatus 100 which employs the screen 220.

The radiographic image capturing apparatus 10A, 10B, 100 may incorporate modifications shown in FIGS. 27 through 31. The modifications shown in FIGS. 27 through 31 are different from the embodiments and modifications shown in FIGS. 1 through 26 in that the radiation source device 18 applies radiations 46a through 46c through the subject 50 to the cassette 12 simultaneously or successively in irradiated ranges which are smaller than the radiation 46 (see FIGS. 6, 8, 14, 20, 21, 24, and 25).

The modifications shown in FIGS. 27 through 31 are effective in capturing radiographic images of the subject 50 with the radiations 46a through 46c applied in the irradiated ranges which are smaller than the radiation 46 when the radiation intensity is set to a weak level and the radiation source device 18 is positioned closely to the cassette 21 for a small SID for better safety against unwanted exposure to the radiation in disaster sites or homes receiving home-care services.

Figure 27:
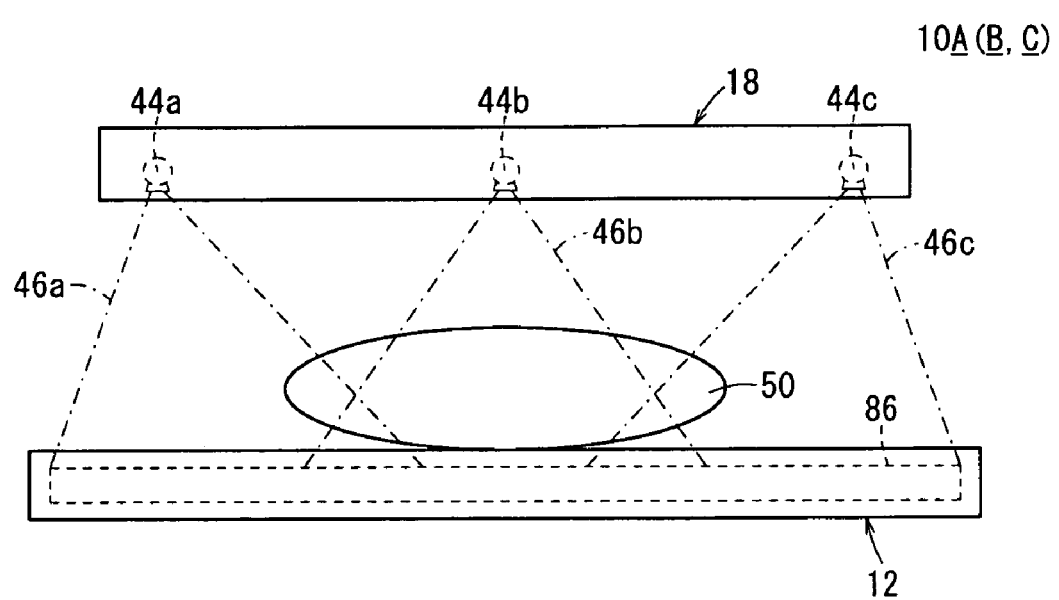
FIG. 27 is a view of a portion of a modification of the radiographic image capturing apparatus according to the first through third embodiments.

According to the modification shown in FIG. 27, the radiation source device 18 houses therein a plurality of radiation sources 44a, 44b, 44c spaced at certain intervals for simultaneously applying the respective radiations 46a, 46b, 46c to the irradiated surface 20 of the cassette 12. The radiation sources 44a, 44b, 44c simultaneously output the respective radiations 46a, 46b, 46c such that the areas irradiated by the radiations 46a, 46b partly overlap each other and the areas irradiated by the radiations 46b, 46c partly overlap each other. The radiations 46a, 46b, 46c thus applied cover the entire area within the outer frame provided by the guide lines 22 (see FIGS. 1, 2, 7, 8, 14 through 17, 20, 24, and 26), reliably without any radiation-free gaps in the area. Even if the radiation intensity is set to a weak level, therefore, it is possible to reliably capture a radiographic image of the subject 50.

Figure 28A:
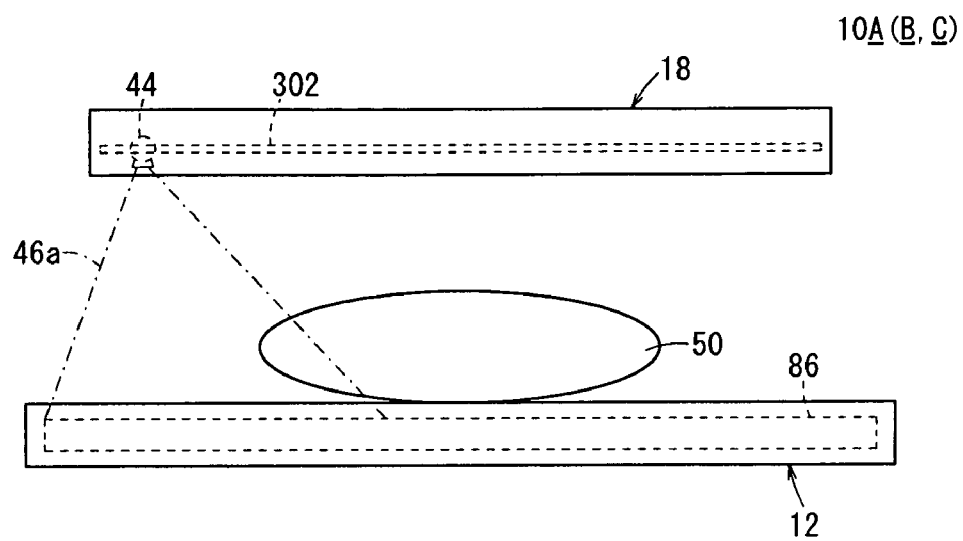
FIGS. 28A and 28B are views of a portion of another modification of the radiographic image capturing apparatus according to the first through third embodiments.
Figure 28B:
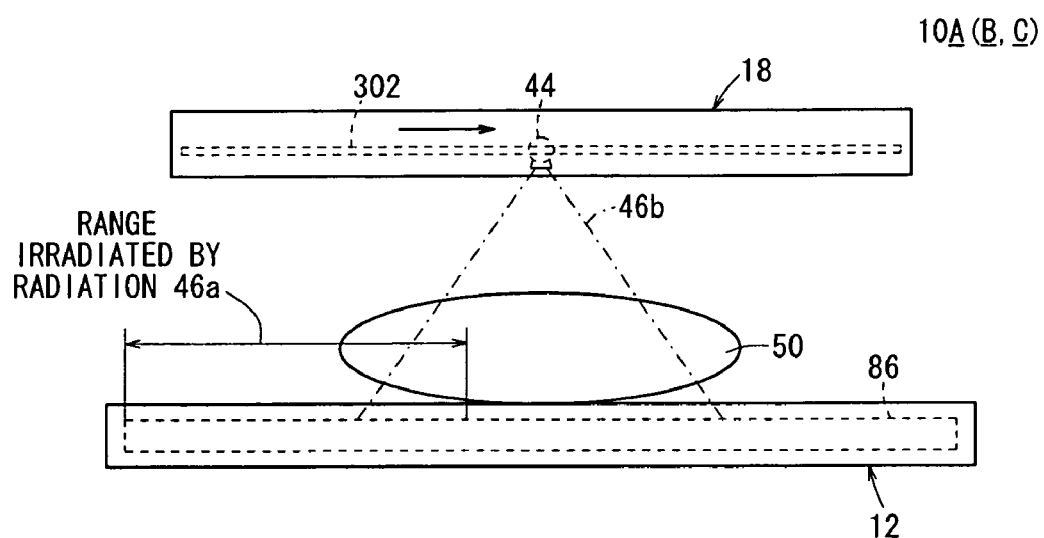
Figure 29:
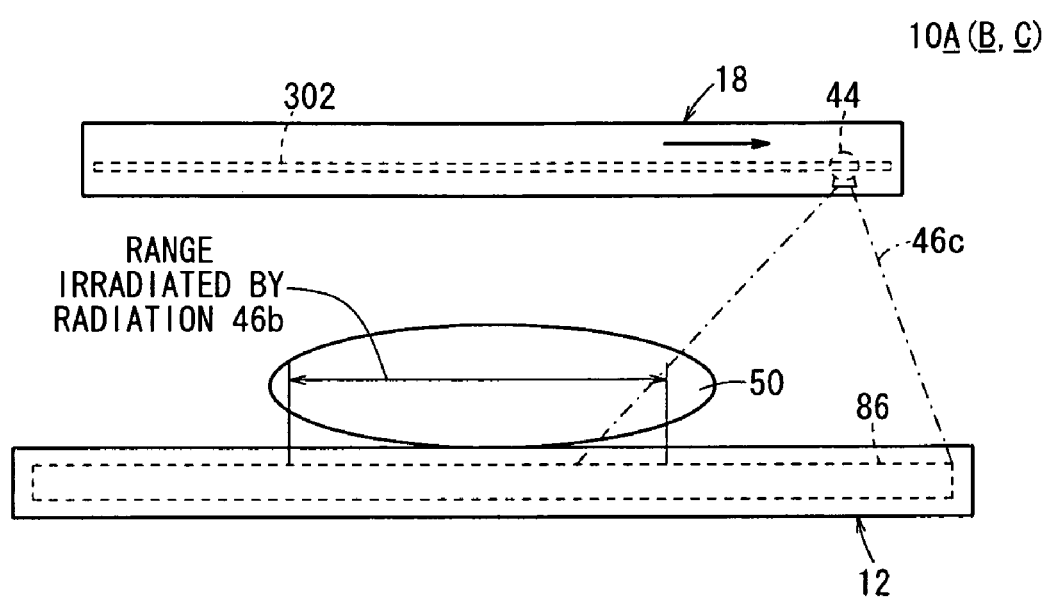
FIG. 29 is a view of a portion of another modification of the radiographic image capturing apparatus according to the first through third embodiments.

According to the modification shown in FIGS. 28A, 28B, and 29, the radiation source device 18 houses therein a rail 302 extending longitudinally therealong, and the radiation source 44 is movable along the rail 302. The radiation source 44 repeatedly moves to certain positions along the rail 302 and applies the radiations 46a, 46b, 46c from respective positions after the radiation source 44 has moved to the certain positions along the rail 302. The radiation source 44 moves to the positions shown respectively in FIGS. 28A, 28B, and 29 and applies the radiations 46a, 46b, 46c from those positions such that the areas irradiated by the radiations 46a, 46b partly overlap each other and the areas irradiated by the radiations 46b, 46c partly overlap each other. The radiations 46a, 46b, 46c thus applied cover the entire area within the outer frame provided by the guide lines 22, reliably without any radiation-free gaps in the area. Even if the radiation intensity is set to a weak level, therefore, it is possible to reliably capture a radiographic image of the subject 50.

Figure 30A:
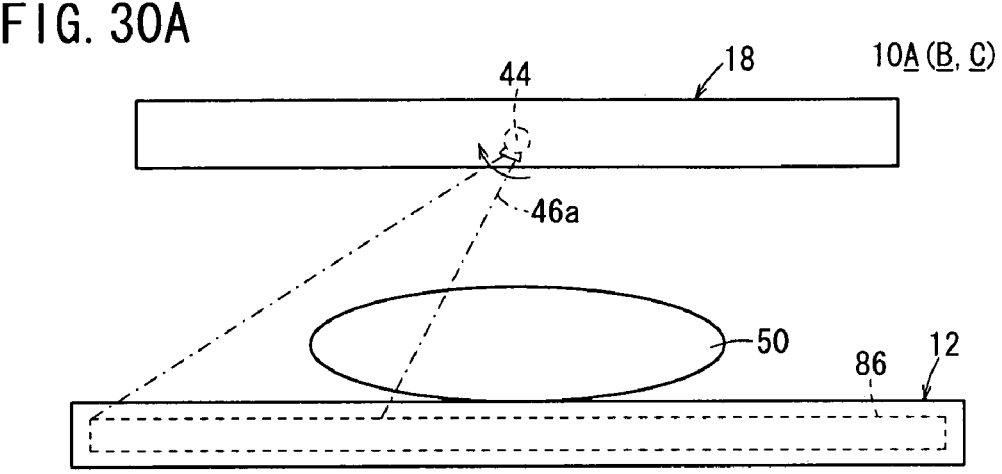
FIGS. 30A and 30B are views of a portion of still another modification of the radiographic image capturing apparatus according to the first through third embodiments.
Figure 30B:
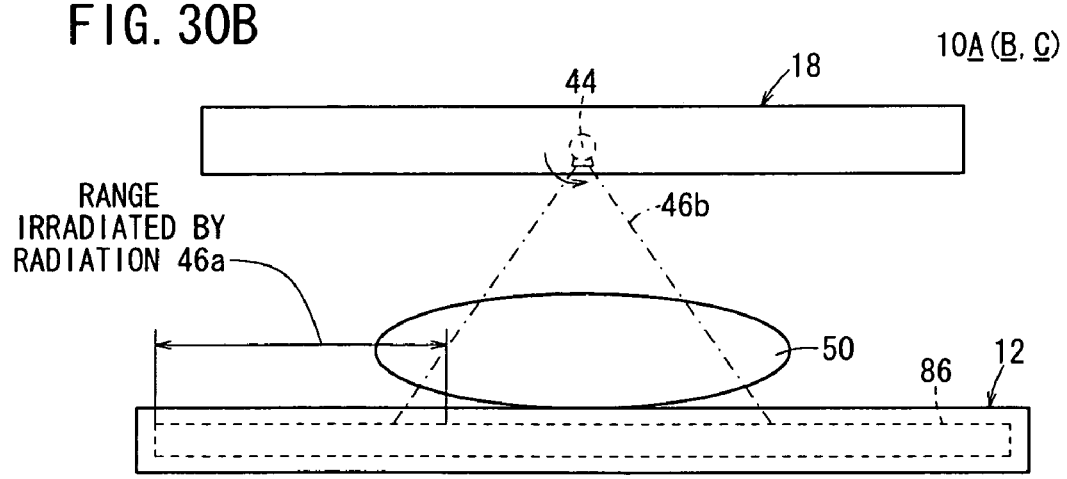
Figure 31:
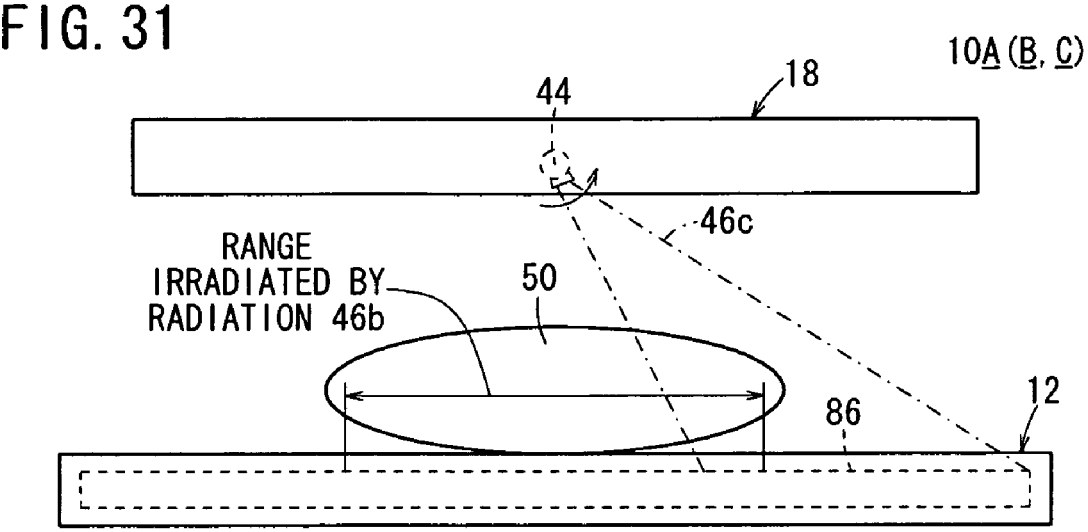
FIG. 31 is a view of a portion of still another modification of the radiographic image capturing apparatus according to the first through third embodiments.

According to the modification shown in FIGS. 30A, 30B, and 31, the radiation source 44 is repeatedly turned to certain angular positions by a turning mechanism, not shown, and applies the radiations 46a, 46b, 46c from respective positions after the radiation source 44 has been turned to the certain angular positions. The radiation source 44 is turned to the angular positions shown in FIGS. 30A, 30B, and 31 and applies the radiations 46a, 46b, 46c from those angular positions such that the areas irradiated by the radiations 46a, 46b partly overlap each other and the areas irradiated by the radiations 46b, 46c partly overlap each other. The radiations 46a, 46b, 46c thus applied cover the entire area within the outer frame provided by the guide lines 22, reliably without any radiation-free gaps in the area. Even if the radiation intensity is set to a weak level, therefore, it is possible to reliably capture a radiographic image of the subject 50.

In the modification shown in FIGS. 27 through 31, the portions of the generated radiographic image which correspond to the overlapping areas irradiated by the radiations 46a, 46b, 46c may be corrected by a known correcting process such as a shading process or the like. In the modification shown in FIG. 27, at least two of the radiation sources 44a, 44b, 44c may be employed to apply the radiations to cover the entire area within the outer frame provided by the guide lines 22, reliably without any radiation-free gaps in the area. In the modifications shown in FIGS. 28A through 31, the sequence in which the radiation source 44 is moved or turned, the positions to which the radiation source 44 is moved, and the angular positions to which the radiation source 44 is turned are not limited to those shown in FIGS. 28A through 31, but may be changed appropriately.

Figure 32:
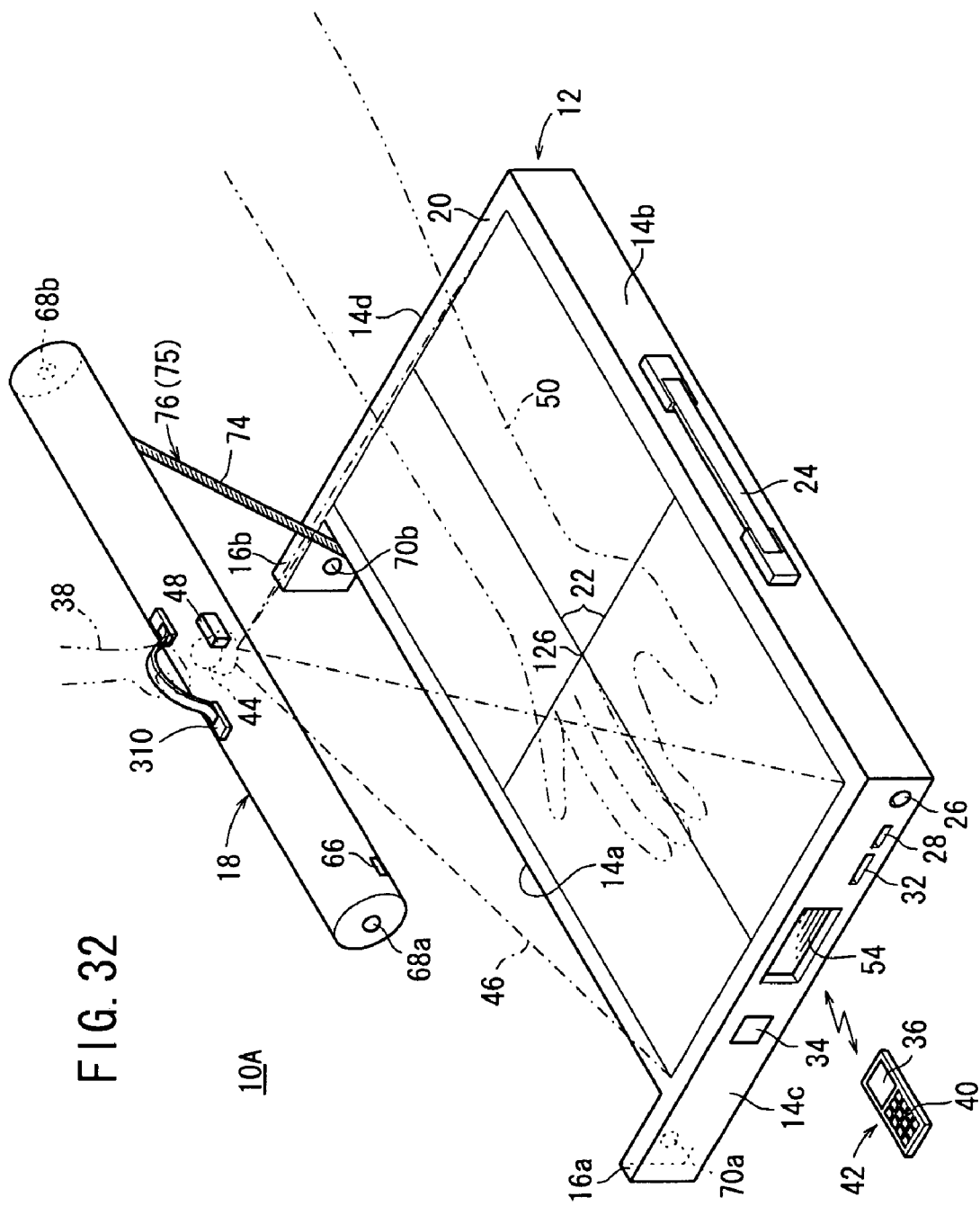
FIG. 32 is a perspective view of another modification of the radiographic image capturing apparatus shown in FIG. 1.
Figure 33:
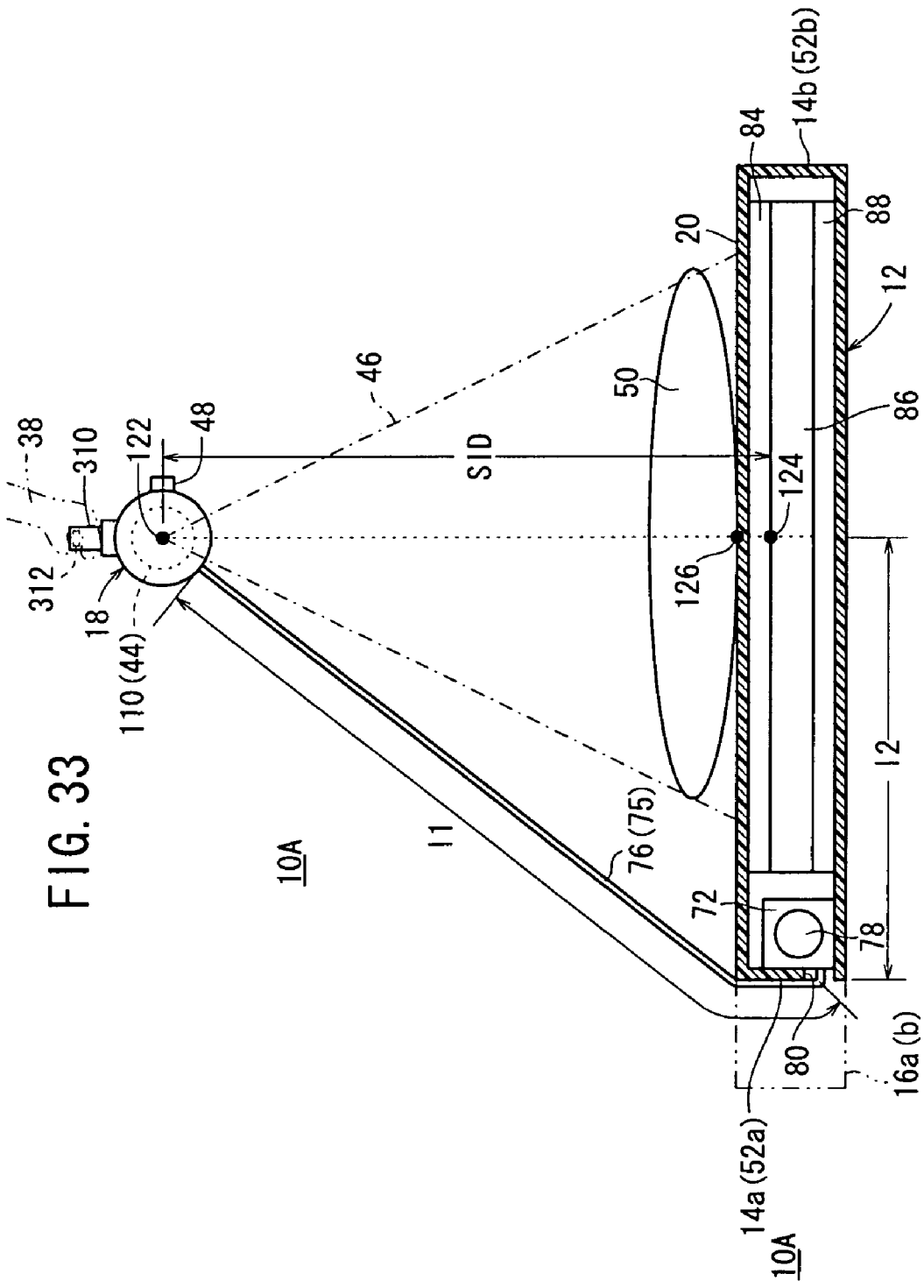
FIG. 33 is an elevational view, partly in cross section, showing the manner in which the radiographic image capturing apparatus shown in FIG. 1 captures a radiographic image.

Further, as shown in FIGS. 32 and 33, the radiation source device 18 of the radiographic image capturing apparatus 10A may have a handle 310 on a portion opposite to the portion from which the radiation 46 is emitted. This arrangement allows the operator 38 to grip the handle 310 to move the radiation source device 18 to a desired position. Further, if the radiation 46 is emitted while the operator is gripping the handle 310, irradiation of the radiation 46 to the operator 38 (exposure to radiation) can reliably be avoided.

Also, the handle 310 is provided with a capacitive or resistive touch sensor 312. When the operator 38 grips the handle 310, the palm of the operator 38 touches an electrode (not shown) of the touch sensor 312. Based on the contact between the palm and the electrode, the touch sensor 312 outputs a detection signal to the radiation source controller 102 and the cassette controller 92 (see FIG. 11). Upon receipt of the detection signal, the radiation source controller 102 or the cassette controller 92 may activate the radiation source device 18 or operate the radiation detector 86.

Although certain preferred embodiments of the present invention have been shown and described in detail, it should be understood that various changes and modifications may be made therein without departing from the scope of the appended claims.

What is claimed is:

1. A radiographic image capturing apparatus comprising:
   a radiation source device housing therein a radiation source for outputting a radiation;
   a cassette housing therein a radiation detector for detecting the radiation which is transmitted through a subject when the subject is irradiated with the radiation by the radiation source, and converting the detected radiation into a radiographic image; and
   a joining mechanism for, selectively, joining the radiation source device and the cassette integrally to each other and separating the radiation source device and the cassette from each other when the radiation source outputs the radiation.

2. A radiographic image capturing apparatus according to claim 1, further comprising:
   a control unit for activating at least one of the radiation source and the radiation detector in a case where the joining mechanism separates the radiation source device and the cassette from each other.

3. A radiographic image capturing apparatus according to claim 2, wherein the control unit inactivates the radiation source and the radiation detector in a case where the joining mechanism integrally joins the radiation source device and the cassette to each other.

4. A radiographic image capturing apparatus according to claim 1, further comprising
   an imaging distance setting unit for setting an imaging distance between the radiation source and the radiation detector to a source-to-image distance.

5. A radiographic image capturing apparatus according to claim 4, wherein the joining mechanism includes a joining member for joining the radiation source device and the cassette to each other, the joining member functioning as a portion of the imaging distance setting unit by separating the radiation source device and the cassette from each other.

6. A radiographic image capturing apparatus according to claim 5, wherein the joining member comprises either an arm by which the radiation source device and the cassette are coupled to each other, a string, a ribbon, or a screen mounted on one of the radiation source device and the cassette and having a distal end fixed to the other of the radiation source device and the cassette.

7. A radiographic image capturing apparatus according to claim 6, wherein the joining member comprises the arm, the arm comprising either an arm having an entire length set to a fixed length depending on the source-to-image distance or a telescopic arm which is extensible and contractible to adjust the imaging distance to the source-to-image distance.

8. A radiographic image capturing apparatus according to claim 7, wherein the arm comprises the telescopic arm, and the imaging distance setting unit comprises an arm length detector for detecting a length of the arm and an imaging distance determining unit for calculating the imaging distance based on a length of the arm which is detected by the arm length detector and determining whether the calculated imaging distance agrees with the source-to-image distance or not.

9. A radiographic image capturing apparatus according to claim 6, wherein the joining member comprises the screen, and one of the radiation source device and the cassette includes a screen housing for housing therein a roll of the screen, the screen having a distal end fixed to the other of the radiation source device and the cassette.

10. A radiographic image capturing apparatus according to claim 6, wherein the imaging distance setting unit comprises a reeled-out length detector for detecting a reeled-out length of the string or the ribbon which is reeled out from the one of the radiation source device and the cassette, and an imaging distance determining unit for calculating the source-to-image distance based on the reeled-out length which is detected by the reeled-out length detector.

11. A radiographic image capturing apparatus according to claim 9, wherein the imaging distance setting unit comprises a reeled-out length detector for detecting a reeled-out length of the screen from the screen housing, and an imaging distance determining unit for calculating the source-to-image distance based on the reeled-out length of the screen which is detected by the reeled-out length detector.

12. A radiographic image capturing apparatus according to claim 1, wherein the radiation source device further houses therein a radiation source battery for energizing the radiation source;
the radiation source device including radiation source connection terminals disposed on respective opposite ends thereof and connected to the radiation source battery; and
the cassette includes holders for holding the opposite ends of the radiation source device to assist in integrally joining the radiation source device to the cassette, and cassette connection terminals for being connected respectively to the radiation source connection terminals in a case where the opposite ends of the radiation source device are held respectively by the holders.

13. A radiographic image capturing apparatus according to claim 12, wherein one of the radiation source connection terminals is convex and the other of the radiation source connection terminals is concave; and
one of the cassette connection terminals which faces the convex radiation source connection terminal is concave and the other of the cassette connection terminals which faces the concave radiation source connection terminal is convex.

14. A radiographic image capturing apparatus according to claim 12, wherein the radiation source battery is charged to a level high enough to capture at least a predetermined number of radiographic images of the subject through the radiation source connection terminals and the cassette connection terminals in a state where the radiation source connection terminals are connected respectively to the cassette connection terminals.

15. A radiographic image capturing apparatus according to claim 1, wherein the joining mechanism comprises a lock unit for keeping the radiation source device and the cassette integrally joined to each other and an unlock unit for releasing the radiation source device and the cassette from being integrally joined to each other by the lock unit.

16. A radiographic image capturing apparatus according to claim 15, wherein the joining mechanism is mounted on the cassette:
the lock unit comprises a hook engageable in a hole defined in a side of the radiation source device which faces the cassette; and
the unlock unit comprises an unlock button for disengaging the hook from the hole to separate the radiation source device from the cassette.

17. A radiographic image capturing apparatus according to claim 16, wherein the cassette includes holders facing respective opposite ends of the radiation source device for holding the opposite ends, respectively, of the radiation source device to assist in integrally joining the radiation source device to the cassette upon engagement of the hook in the hole.

18. A radiographic image capturing apparatus according to claim 15, wherein the joining mechanism is mounted on the radiation source device;
the lock unit comprises a hook engageable in a hole defined in a side of the cassette which faces the radiation source device; and
the unlock unit comprises an unlock button for disengaging the hook from the hole to separate the cassette from the radiation source device.

19. A radiographic image capturing apparatus according to claim 18, wherein the radiation source device further houses therein a radiation source battery for energizing the radiation source;
the radiation source device includes two radiation source connection terminals disposed on a side thereof which faces the cassette and connected to the radiation source battery; and
the cassette includes cassette connection terminals disposed on a side thereof which faces the radiation source device in facing relation to the radiation source connection terminals.

20. A radiographic image capturing apparatus according to claim 15, wherein the joining mechanism further includes an arm by which the radiation source device and the cassette are coupled to each other, the arm being angularly movably connected at a proximal end thereof to either the radiation source device or the cassette;
the lock unit keeps the radiation source device and the cassette integrally joined to each other by locking the arm against angularly moving around the proximal end; and
the unlock unit releases the radiation source device and the cassette from each other by unlocking the arm from the lock unit.

21. A radiographic image capturing apparatus according to claim 20, wherein the joining mechanism further includes an arm turning unit for turning the arm about the proximal end of the arm in a state where the arm is unlocked from the lock unit by the unlock unit.

22. A radiographic image capturing apparatus according to claim 21, wherein the lock unit, the unlock unit, and the arm turning unit are mounted on the cassette;
the proximal end of the arm is connected to the cassette, the arm having a distal end connected to the radiation source device;
the lock unit comprises a hook for engaging the arm to prevent the arm from being turned by the arm turning unit;
the unlock unit comprises an unlock button for disengaging the hook from the arm to allow the arm to be angularly movable; and
the arm turning unit comprises a torsion spring for angular movement of the arm and the radiation source device in unison with each other about the proximal end of the arm in a state where the arm is allowed to angularly move by the unlock button.

23. A radiographic image capturing apparatus according to claim 1, wherein the radiation source is oriented toward the cassette in a state where the radiation source device and the cassette are integrally joined to each other by the joining mechanism.

24. A radiographic image capturing apparatus according to claim 1, further comprising:
an exposure inhibition controller for inhibiting the radiation source from outputting the radiation in a state where the radiation source device and the cassette are integrally joined to each other by the joining mechanism, the exposure inhibition controller being mounted on either the radiation source device or the cassette.

25. A method of capturing a radiographic image, comprising the steps of:
- moving a radiation source device and a cassette which are integrally joined to each other by a joining mechanism;
- thereafter, separating the radiation source device and the cassette from each other;
- outputting a radiation from a radiation source housed in the radiation source device and applying the radiation to a subject;
- detecting the radiation which is transmitted through the subject and converting the detected radiation into a radiographic image with a radiation detector housed in the cassette; and
- thereafter, integrally joining the radiation source and the cassette to each other with the joining mechanism.

26. A method according to claim 25, further comprising the steps of:
- after the radiation source device and the cassette are separated from each other, setting a source-to-image distance between the radiation source and the radiation detector with an imaging distance setting unit; and
- outputting the radiation from the radiation source after the source-to-image distance is set.

27. A method according to claim 25,
wherein the radiation source device and the cassette are integrally joined to each other with the joining mechanism to inactivate the radiation source and the radiation detector which have been activated.

* * * * *